(12) United States Patent
Langenfeld et al.

(10) Patent No.: US 8,890,346 B2
(45) Date of Patent: Nov. 18, 2014

(54) SYSTEM AND METHOD FOR OPERATING A WIND TURBINE

(75) Inventors: Christopher C. Langenfeld, Nashua, NH (US); Stanley B. Smith, III, Raymond, NH (US); Andrew A. Schnellinger, Merrimack, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 13/250,339

(22) Filed: Sep. 30, 2011

(65) Prior Publication Data

US 2012/0068463 A1    Mar. 22, 2012

Related U.S. Application Data

(63) Continuation of application No. 13/039,640, filed on Mar. 3, 2011.

(60) Provisional application No. 61/310,940, filed on Mar. 5, 2010.

(51) Int. Cl.
| | |
|---|---|
| *F03D 9/00* | (2006.01) |
| *F03D 3/06* | (2006.01) |
| *F03D 3/00* | (2006.01) |
| *F03D 7/02* | (2006.01) |
| *F03D 7/06* | (2006.01) |

(52) U.S. Cl.
CPC ............. *F03D 3/005* (2013.01); *F05B 2220/25* (2013.01); *Y02E 10/74* (2013.01); *F03D 3/062* (2013.01); *Y02B 10/30* (2013.01); *F05B 2240/31* (2013.01); *F05B 2240/98* (2013.01); *F03D 7/0248* (2013.01); *F05B 2270/325* (2013.01); *F05B 2270/808* (2013.01); *F03D 7/06* (2013.01); *F03D 7/0236* (2013.01)
USPC ............................................ 290/44; 290/55

(58) Field of Classification Search
CPC ....... F03D 3/005; F03D 3/062; F03D 7/0236; F03D 7/0248; F03D 7/06; F05B 2220/25; F05B 2240/31; F05B 2240/98; F05B 2270/325; F05B 2270/808; Y02B 10/30; Y02E 10/74
USPC ...................................................... 290/44, 55
See application file for complete search history.

(56) References Cited

U.S. PATENT DOCUMENTS

| | | | | |
|---|---|---|---|---|
| 4,435,978 | A | * | 3/1984 | Glatz .......................... 73/152.31 |
| 4,565,929 | A | * | 1/1986 | Baskin et al. ................... 290/44 |

(Continued)

FOREIGN PATENT DOCUMENTS

| | | | |
|---|---|---|---|
| DE | 202005014265 | U1 | 12/2005 |
| FR | 2914983 | A1 | 10/2008 |

OTHER PUBLICATIONS

International Search Report with Written Opinion, dated Aug. 25, 2011, received in international patent application No. PCT/US2011/027015, 12 pages.

(Continued)

*Primary Examiner* — Tulsidas C Patel
*Assistant Examiner* — S. Mikailoff
(74) *Attorney, Agent, or Firm* — Michelle Saquet Temple

(57) ABSTRACT

A wind turbine system is disclosed. The system includes a controller configured to receive at least one output from at least one measurement device, an anemometer in communication with the system controller, the anemometer for measuring wind speed, a temperature sensor in communication with the system controller, the temperature sensor for measuring ambient temperature, a transmission, and a load cell coupled to the transmission and in communication with the system controller, the load cell configured to measure the torque output of the transmission, wherein the system controller receives wind speed, ambient temperature and load cell information and determines optimal power outputs of the wind turbine for a weather condition.

4 Claims, 28 Drawing Sheets

(56) References Cited

U.S. PATENT DOCUMENTS

| | | |
|---|---|---|
| 7,381,030 B1 | 6/2008 | Vanderhye |
| 2006/0152016 A1* | 7/2006 | Bywaters et al. ............... 290/55 |
| 2006/0214428 A1* | 9/2006 | Altemark et al. ............... 290/44 |
| 2006/0273595 A1* | 12/2006 | Avagliano et al. ............. 290/44 |
| 2008/0296905 A1 | 12/2008 | Ferguson |
| 2009/0039650 A1* | 2/2009 | Nies ............................... 290/44 |
| 2009/0079193 A1* | 3/2009 | Nielsen et al. .................. 290/44 |
| 2009/0295160 A1* | 12/2009 | Wittekind et al. .............. 290/44 |
| 2010/0143119 A1* | 6/2010 | Kooijman et al. ............... 416/1 |
| 2010/0259045 A1* | 10/2010 | Vilbrrandt ....................... 290/44 |
| 2011/0133457 A1* | 6/2011 | Hoffmann et al. .............. 290/44 |
| 2011/0135465 A1* | 6/2011 | Braicks .............................. 416/1 |
| 2011/0215738 A1* | 9/2011 | Kamen et al. .................. 315/302 |

OTHER PUBLICATIONS

International Preliminary Report on Patentability & Written Opinion, dated Sep. 20, 2012, received in international patent application No. PCT/US2011/027015, 8 pages.

* cited by examiner

| FIG. 12E | FIG. 12I | FIG. 12M |
|---|---|---|
| FIG. 12D | FIG. 12H | FIG. 12L |
| FIG. 12C | FIG. 12G | FIG. 12K | FIG. 12O |
| FIG. 12B | FIG. 12F | FIG. 12J | FIG. 12N |

FIG. 12A

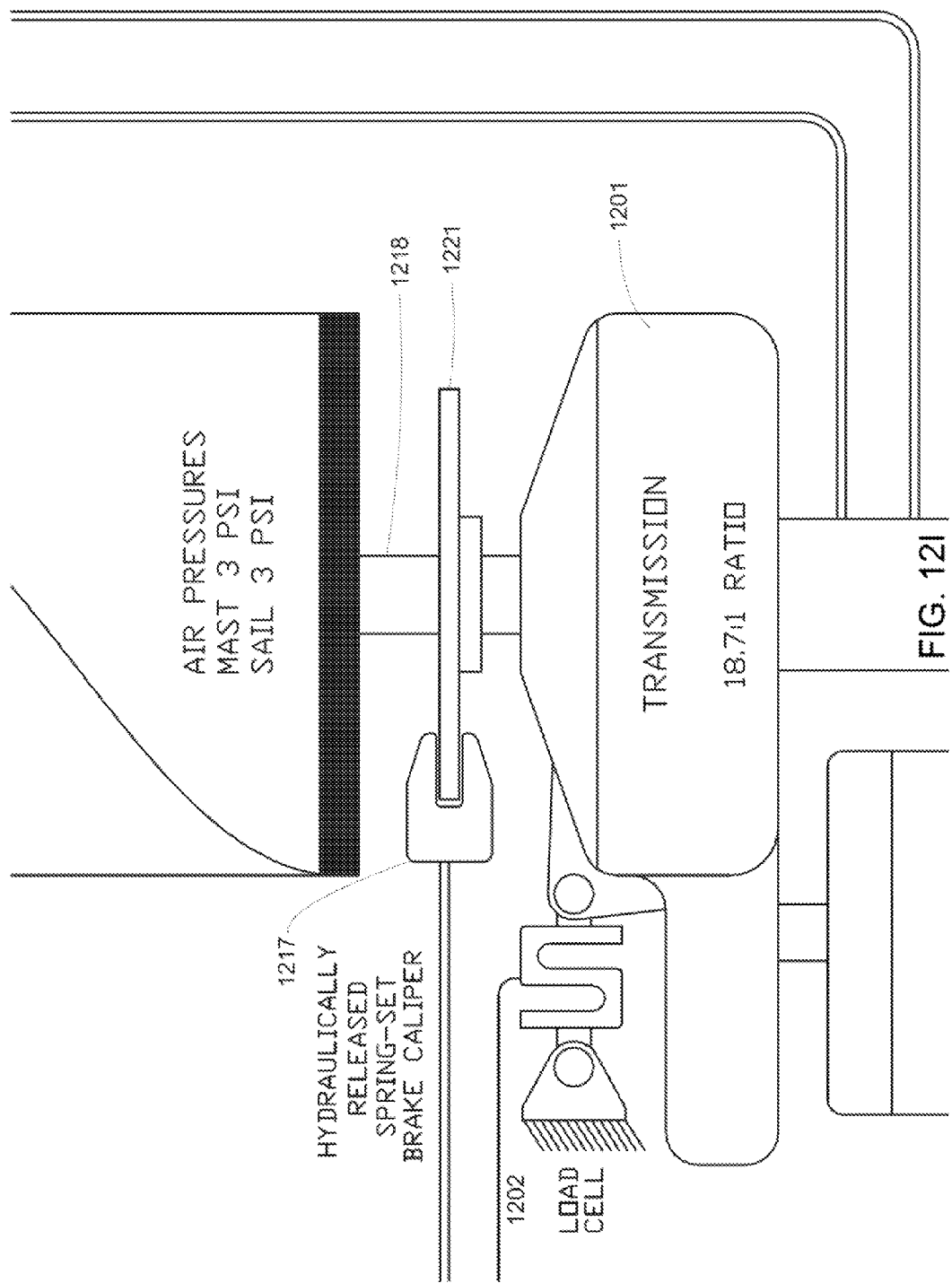

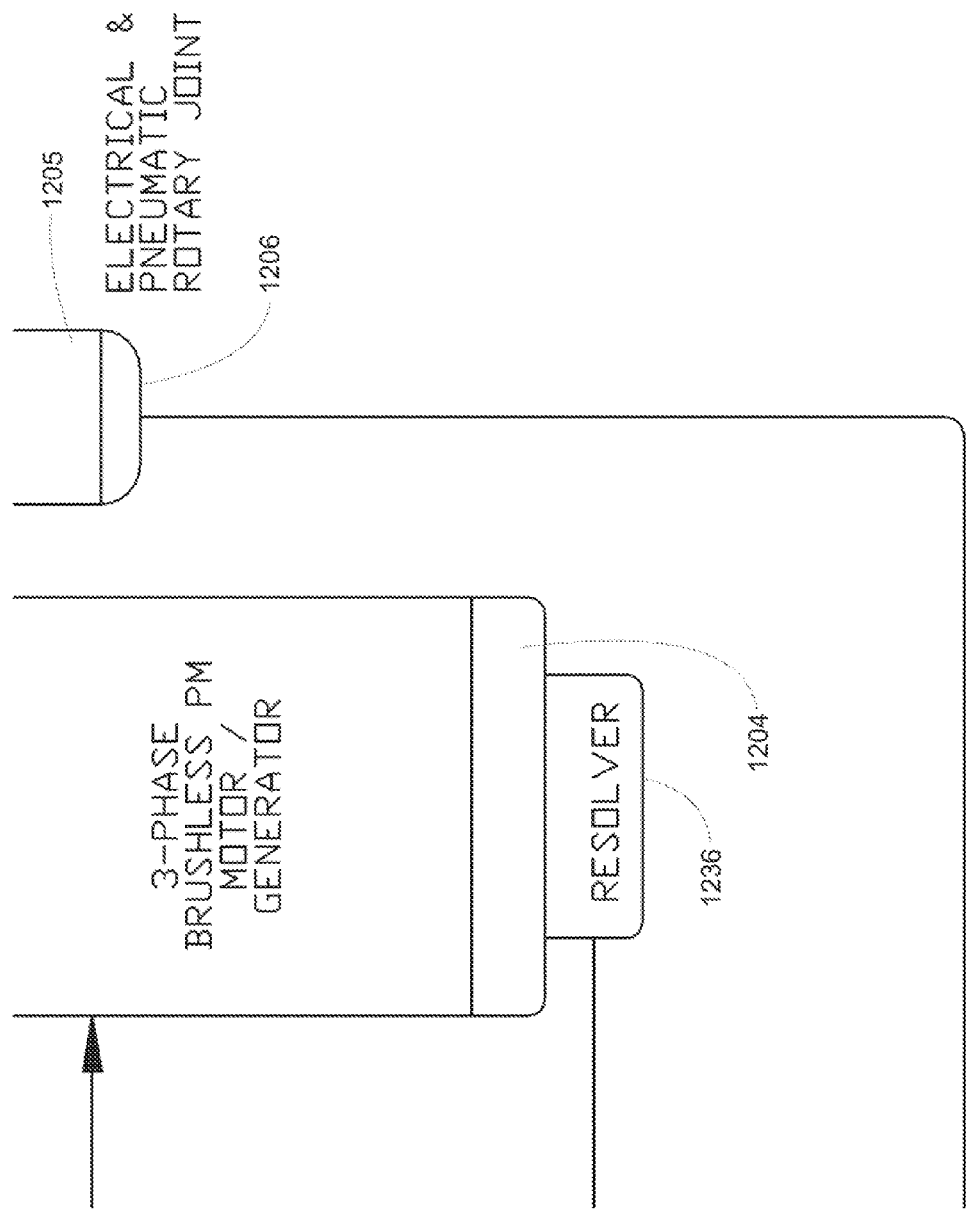

US 8,890,346 B2

SYSTEM AND METHOD FOR OPERATING A WIND TURBINE

CROSS REFERENCE TO RELATED APPLICATIONS

The present application is a continuation of U.S. patent application Ser. No. 13/039,640, filed on Mar. 3, 2011 and entitled Wind Turbine Apparatus, Systems and Methods, now U.S. Publication Number US-2011-0215738, published Sep. 8, 2011, which itself claims priority from U.S. Provisional Patent Application Ser. No. 61/310,940, filed Mar. 5, 2010 and entitled Inflatable Wind Turbine, both of which are hereby incorporated herein by reference in their entireties.

TECHNICAL FIELD

The present disclosure relates to wind turbines and more particularly, to wind turbines and systems and methods for wind turbines.

BACKGROUND INFORMATION

A wind turbine is a device which converts the energy of wind into electrical energy. This method of generating electrical power may be beneficial to the environment for many reasons, including, but not limited to, that it consumes from a small amount to no fuel and emits from a small amount to no air pollution, unlike many fossil fuel power sources. One type of wind turbine is a horizontal axis wind turbine. These types of turbines typically include a main rotor shaft with large blades and electrical generator at the top of a tower. To turn the blades, the rotor may be pointed into the wind.

SUMMARY

In accordance with one aspect of the present invention, a wind turbine is disclosed. The wind turbine includes one or more of the embodiments described herein.

In accordance with one aspect of the present invention, a wind turbine is disclosed. The wind turbine includes a vertical axis inflatable sail.

In accordance with one aspect of the present invention, a control system for a wind turbine is disclosed.

In accordance with one aspect of the present invention, a wind turbine is disclosed. The wind turbine includes an inflatable portion comprising one or more blades and a device for rotationally driving the inflatable portion at a predetermined rate for a predetermined time.

Some embodiments of this aspect of the invention may include one or more of the following. Wherein the inflatable portion comprising one or more separately inflatable sections. Wherein the wind turbine further includes a display system comprising a plurality of light emitting diodes. Wherein the plurality of light emitting diodes is powered by energy generated by the wind turbine. Wherein the wind turbine further includes a control system configured to control the inflation and deflation of the inflatable portion. Wherein the control system further configured to command the device to rotatably drive the inflatable portion based on wind speed. Wherein the control system further configured to command the device to rotatably drive the inflatable portion based on temperature. Wherein the control system further configured to rotatably drive the inflatable portion based on weather conditions. Wherein the wind turbine further includes a hydraulic brake system wherein the hydraulic brake system is a fail safe brake system.

In accordance with one aspect of the present invention, a wind turbine system is disclosed. The system includes a wind turbine including an inflatable portion comprising one or more blades and a device connected to the inflatable portion. The device for rotatably driving the inflatable portion at a predetermined rate for a predetermined time. The system also includes a mobile transportation unit connected to the device.

Some embodiments of this aspect of the invention may include one or more of the following: wherein the inflatable portion comprising and one or more separately inflatable sections; wherein the system further includes a display system comprising a plurality of light emitting diodes; wherein the plurality of light emitting diodes is powered by energy generated by the wind turbine; wherein the mobile transportation unit comprising one or more batteries and the one or more batteries receive energy input from the wind turbine; wherein the system further includes a control system configured to control the inflation and deflation of the inflatable portion; wherein the system further includes a control system configured to command the device to rotatably drive the inflatable portion based on wind speed; wherein the control system further configured to command the device to rotatably drive the inflatable portion based on temperature; wherein the control system further configured to command the device to rotatably drive the inflatable portion based on weather conditions; and/or wherein the system further includes a hydraulic brake system wherein the hydraulic brake system is a fail safe brake system.

These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

These and other features and advantages of the present invention will be better understood by reading the following detailed description, taken together with the drawings wherein.

DETAILED DESCRIPTION OF THE EXEMPLARY EMBODIMENTS

Figure 1:
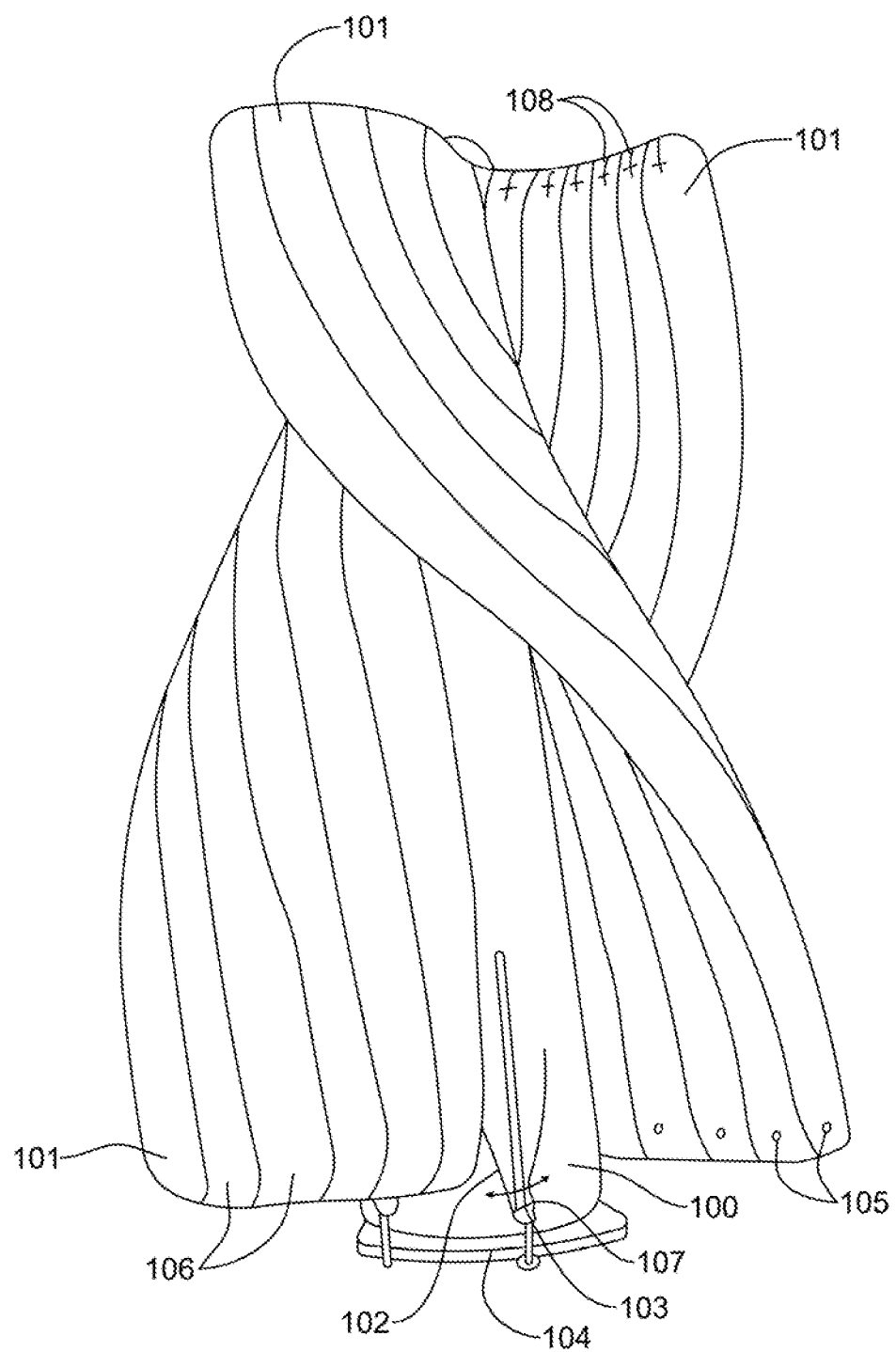
FIG. 1 is a view of one embodiment of an inflatable vertical axis wind turbine sail.

Various embodiments include a wind turbine system including an inflatable portion which may include an inflatable rotor portion. An inflatable rotor, also referred to as an inflatable sail, imparts many advantages onto the system, which may include, but are not limited to, one or more of the following. The inflatable sail may be inflated and/or deflated using a control system. This makes installation of the system easier than conventional wind turbines, as well, the system may be easily transported and/or relocated. In some embodiments, the inflatable sail may be connected to a platen which may be attached to a motor vehicle and/or movable trailer and/or a moveable vehicle. In some embodiments, the system may be attached to a flat bed portion of a truck which may increase the ease of transport.

Transporting and/or moving a wind turbine may be advantageous for many reasons, including, but not limited to, the ability to move the wind turbine based on weather patterns and/or predictions. Thus, where a conventional wind turbine is installed in a particular location and relocation is a highly involved process, where the particular location of install experiences low wind and/or inadequate wind for energy generation and/or preferring amount of energy generation, and/or experiences weather that may be harmful to the wind turbine, that wind turbine may fail to meet a predetermined need and/or be harmed by the weather. However, in various embodiments of an inflatable sail wind turbine, the inflatable sail wind turbine, experiencing non-optimal weather conditions, may be moved/relocated to an area with more beneficial weather conditions and/or safer weather conditions.

Various embodiments of the inflatable sail wind turbine may additionally present advantages in that the sail is light weight. Thus, the sail may be turned more easily by the wind. As well, the inflatable sail wind turbine may be installed in various locations that a heavier and/or larger conventional wind turbine may not, for example, but not limited to, on the roof of buildings. In some embodiments, the inflatable sail wind turbine may, in addition to an energy generation device, serve as an advertisement and/or billboard device. As discussed in more detail below, in some embodiments, the inflatable sail wind turbine may include one or more display systems which may include graphics and/or text and/or images. In some embodiments, these display systems may include light emitting diodes (LEDs), however, in some embodiments, the display system may include screen printed displays. In some embodiments, the inflatable sail wind turbine may generate sufficient energy to power the display systems. In some embodiments, the inflatable sail may include a graphic and/or text screen printed onto the sail.

In some embodiments of the inflatable sail wind turbine, the system may determine inflate and deflate commands based on one or more, but not limited to, the following: wind speed, wind direction, temperature, and/or weather predictions. On board anemometer and wind vanes may provide data related to wind speed and wind direction respectively. In some embodiments, temperature may be used to calibrate the anemometer. In various embodiments, inflation of the inflatable sail may be accomplished using a blower, which, in some embodiments, may be an regenerative blower. Pressure sensors may be used by a control system to monitor the air pressure in the sail and determine whether additional air should be added (inflation) or air should be removed (deflation). In some embodiments, the control system may use predetermined thresholds to determine whether to inflate and/or deflate. Again, the control system may use the weather conditions and/or prediction in the control scheme for determining whether to inflate and/or deflate. In some embodiments, the system includes at least one back pressure regulator. In some embodiments the back pressure regulator may include a preset pressure threshold. In some embodiments, where the pressure exceeds the threshold, the system will vent to atmosphere. This method and system may be used to prevent popping of the inflated sail.

In some embodiments, the system may include an air compressor. In some embodiments, the system may use an air compressor from a nearby building, for example, from a building in which the inflatable sail wind turbine is installed on the roof.

In some embodiments, the system may include a hydraulic brake system. The hydraulic brake, in some embodiments, may be powered by a hydraulic power unit. Thus, in some embodiments, the brake system includes a pressurized hydraulic brake. In some embodiments, where power is not longer powering the solenoids in the brake system (which control the calipers, for example), the brake is actuated and thus the turbine stops spinning. In some embodiments, the system includes at least one brake pressure sensor. This brake pressure sensor may send pressure data to the control system and the control system may use this data to determine whether the solenoid is on and whether the system has sufficient pressure to mechanically release the brake. Thus, this design may prevent destruction of the transmission. Thus, in some embodiments, the system includes a fail safe braking system.

Some embodiments of the system include a measurement of the torque on the transmission using a strain gauge/load cell. The strain gauge/load cell communicates information regarding the torque on the transmission to the controller. Additionally, the system may measure the RPM of the turbine using a resolver on the motor ("motor resolver"). Thus, the motor resolver communicates information relating to RPM to the controller. Thus, the controller receives information regarding torque and RPM and therefore may calculate/computer/measure the power generation of the wind turbine system.

In some embodiments of the system, the controller determines whether to turn the inflatable sail using power as a function of at least the wind speed. Thus, the wind turbine in some embodiments of the system may turn using both wind energy and power from the system. The amount of power and the speed the controller commands the sail to turn may be determined using one or more inputs, which may include, but is not limited to, wind speed, wind direction, weather patterns, current weather, weather predictions and/or temperature. In some embodiments, the system includes a 24V power supply, however, in various embodiments, the power supply may vary.

In some embodiments, the energy generated by the inflatable sail wind turbine may be used to power one or more system, which may include, but are not limited to, the display system and/or the wind turbine itself. In some embodiments, the energy generated may be used to cool the system (shunt cooling system) and/or to heat water by circulating water through the system to dissipate the power the wind turbine is generating.

In various embodiments, the system includes a communication system which may include a wireless router in some embodiments. The communication system may be used in some embodiment for remote data collection, remote control of the system and/or web cam to determine current weather and/or status of the system. Thus, in some embodiments, the system includes complete remote control and data logging. In some embodiments, the system may be run at an optimal level using inputs which include, but are not limited to, wind speed, temperature, power output of the system by load cell/RPM and/or pure power output, and in some embodiments, using this information, the system may allow the sail to change RPM to attain an optimal/peak power level. In some embodiments, the system may determine the peak power at various wind speeds.

Various embodiments of the system include a method for self-starting the wind turbine. In some embodiments, using input, for example, wind speed, the control system may determine whether to turn the rotor/sail and/or to allow only the wind to turn the rotor/sail. In some embodiments, the system may use input from at least one pressure sensor to determine whether to power on the system. In various embodiments, the system may use historical data to determine the most optimal conditions for turning the power on to the rotor/sail and/or when to start turning the rotor/sail using the power from the system. The system may turn the rotor/sail at any RPM desirable, therefore, using historical data to determine the optimal time and the optimal RPM may improve and/or optimize the overall power generation of the system.

In some embodiments, the system may be powered using rechargeable power sources, e.g., batteries. In some embodiment, the rechargeable power sources may be recharged by the energy generated by the wind turbine. In some embodiments, the wind turbine may be electrically connected/in electrical communication with another device/apparatus which may include, but is not limited to, an electric vehicle. In some embodiments, a vehicle and/or trailer in which the wind turbine is connected may include one or more rechargeable batteries which may power one or more device, including, but not limited to, the engine, and these one or more rechargeable batteries may be charged by the energy generated by the inflatable sail wind turbine system. However, in various embodiments, the energy generated by the inflatable sail wind turbine may be used to power any device/system/apparatus.

Described herein is wind turbine including an inflatable portion. In some embodiments, described herein is a vertical axis wind turbine including an inflatable portion which may be, in some embodiments, an inflatable rotor, which may be termed for purposes of this disclosure, an inflatable sail. Although various embodiments of the sail are disclosed herein, other embodiments are contemplated. The sail may have any number of blades. Further, the sail may include one or more separately inflatable sections. Also, within each of the one or more sections of the sail, the sail may include one or more inflatable bladders or sub-sections. The one or more inflatable bladders may be any shape, size or orientation, including, but not limited to, horizontal, vertical, diagonal, rectangular, round and square.

As discussed below, the wind turbine includes a control system. Although various embodiments are described below, these are exemplary embodiments serving as examples of a wind turbine control system as it may be used with respect to an inflatable vertical axis wind turbine. However, in other embodiments, one or more embodiments of one or more components of the control system described herein may be used to control one or more horizontal axis wind turbines. Thus, the scope of the disclosure may not be limited to vertical axis wind turbines.

As described in the various embodiments below, the exemplary embodiment of the vertical axis wind turbine includes an inflatable sail. In some embodiments, the inflatable sail may be connected to and/or mounted to and/or attached to a device which rotatably drives the sail at a predetermined rate for a predetermined time. In some embodiments, a timer may be included and in some embodiments, the timer may rotatably drive the sail at a predetermined rate during predetermined hours on predetermined days, e.g., at 10 RPM from 7 am-10 pm Monday through Friday and/or from 9 am-11 pm Saturday and Sunday, however, these are mere examples, any schedule may be preset and/or any predetermined schedule may be used. In other embodiments, the device may rotatably drive the sail at a minimal/threshold rate, and this drive may cease once a control system determines that there is enough wind to drive the sail at or above the minimum/predetermined rate. The minimum rate may be preprogrammed and may be changed using the control system. In some embodiments, during those hours when the sail is not being actively driven at a predetermined rate, the sail may be driven by the wind. And, in some embodiments, during this time, the wind energy may be used to charge a power source that drives the sail. In other embodiments, during those hours when the sail is not being actively driven at a predetermined rate, the sail may be deflated.

In other embodiments, and in some modes, the sail may be driven at a predetermined rate without regard for wind speed. The drive may be powered by one or more batteries, which may/may not be charged by the wind turbine. In some embodiments, the drive may be powered by electric power available from the grid. In some embodiments, the drive may be powered by a battery that may be charged through any means, including, but not limited to, one or more of the following: wind, solar, grid electric power, and steam.

In some embodiments, the control system or system controller may wirelessly communicate with a remote machine through one or more modes of wireless communications including, but not limited to, internet and cell. Thus, the wind turbine system controller may be controlled and/or monitored from a remote location. The system controller/control system may be programmed with one or more various algorithms that may respond to one or more inputs, including, but not limited to, one or more of the sensors on the wind turbine, weather reports, weather forecasts, and satellite weather images. The input parameters, the processing of those input parameters and the output commands may, in some embodiments, be changed and thus, the control system may be changed remotely. Additionally, the controls system may be located in a controls center which may control one or more wind turbines. For each wind turbine, the algorithms may be different, or the same, and may be altered or changed either separately or together. In some embodiments, updated controls software may be uploaded to a controls server which controls one or more wind turbines. A centralized system for controlling wind turbines may be beneficial for one or more reasons. In some embodiments, the control system may include algorithms to detect trends which may be fed into the controls. In some embodiments, the control system may perform a number of start-up tests to determine optimal speed ratios including, but not limited to, optimal tip speed ratios. With respect to sensors and inputs, the control system may receive input signals which may be associated with, but is not limited to, one or more of the following: wind speed, wind direction, wind density/air density, air pressure, and temperature. In some embodiments, the control system may control the RPM of the sail to reach an optimal peak power level. As the peak power level may vary depending on one or more factors, peak power RPM may be determined through start-up testing and may be saved such that the system may recognize the same pattern in the future. In some embodiment, where a pattern is not recognized by the control system, the system may perform a number of tests during that pattern to determine one or more peak performance ratios/values.

In some embodiments, the sail may include one or more advertisements and/or messages. In some embodiments, two or more wind turbines may be linked together in the same location and synchronized with respect to rotations per minute.

In some embodiments, the wind turbine may be connected to a building, a geological feature, for example, a hill top and/or a rock formation. However, in some embodiments, the wind turbine may be mobile. As shown and described herein, in some embodiments, the wind turbine may be connected to a truck or a trailer. Thus, the wind turbine may be fully portable. Further, in some embodiments, the energy generated by the wind turbine may be used to charge one or more batteries on the truck or trailer and in turn, these one or more batteries on the truck or trailer may be used to charge another battery, e.g., a car battery. In some embodiments, the truck and/or trailer battery may be charged by the wind turbine.

Inflatable Sail

Referring to FIG. 1, a perspective view of an inflatable vertical axis wind turbine sail is shown. In one embodiment, the inflatable vertical axis wind turbine sail may be comprised of an inflatable mast 100 and at least two inflatable blades 101 coupled to the mast 100. Although two (2) inflatable blades may be used, in some embodiments three (3) inflatable blades may be used. However, in other embodiments, more than 3 or less than 2 blades may be used. Additional blades may be desirable in some embodiments due to the increased support the inflatable blades may provide the inflatable mast. In some embodiments, the inflatable vertical axis wind turbine sail may be shaped like a drag-type wind turbine such as, but not limited to, a Savonius rotor. In such embodiments, the mast 100 may be a conical shape. The conically-shaped mast may have an approximate diameter of two (2) feet at the top and five (5) feet at the bottom and a height of approximately twelve (12) feet. Further, in such embodiments, the blades 101 may have a diameter of twelve (12) feet. In another embodiment, the mast 100 and the blades 101 may be made from a fabric such as, but not limited to, polyethylene terephtalate fabric. In some embodiments, other materials may be used to make the mast and blades. In such embodiments, the polyethylene terephtalate fabric may be sewn to divide the blades 101 into a plurality of cells 106. Further, in such embodiments, a bladder (not shown) may be inserted inside each cell 106 in the blade 101 and inside the mast 100 to hold pressurized gas/air. In some embodiments, the bladder may be made of urethane. In some embodiments, other materials may be used to make the bladder including, but not limited to, any material that may hold gas/air, which may include, but is not limited to, one or more of the following: PVC/vinyl, Mylar, and/or polyethylene. In some embodiments, bladder material, for example, urethane may be laminated to the sail material, which may include, but is not limited to, nylon.

In some embodiments, a fitting 105 may be coupled to each bladder to allow air to be pumped into and released from the bladder. In some embodiments, it may be desirable to fill the bladders at the top to promote even filling of the bladder. In some embodiments, it may be desirable to provide foam supports at the top of the bladder to promote even filling of the bladder. Zippers 108 may be placed in the fabric to allow for access to the bladders. In some embodiments, the bladders may be suspended within the cells 106 and mast 100 by tying the bladder to the fabric at the top of the cell 106 and by tying the bladder to the fabric at the top of the mast 100. In some embodiments, the mast 100 and blades 101 may be made out of nylon fabric that has been sealed to be air tight. The mast 100 may be coupled a platen 104. In some embodiments, the mast 100 may include nylon webbing 102 sewn into the fabric. In some embodiments, clevis fasteners 103 may be bolted into the platen 104. The clevis fasteners 103 may then be coupled to the nylon webbing with a pin 107.

Figure 2:
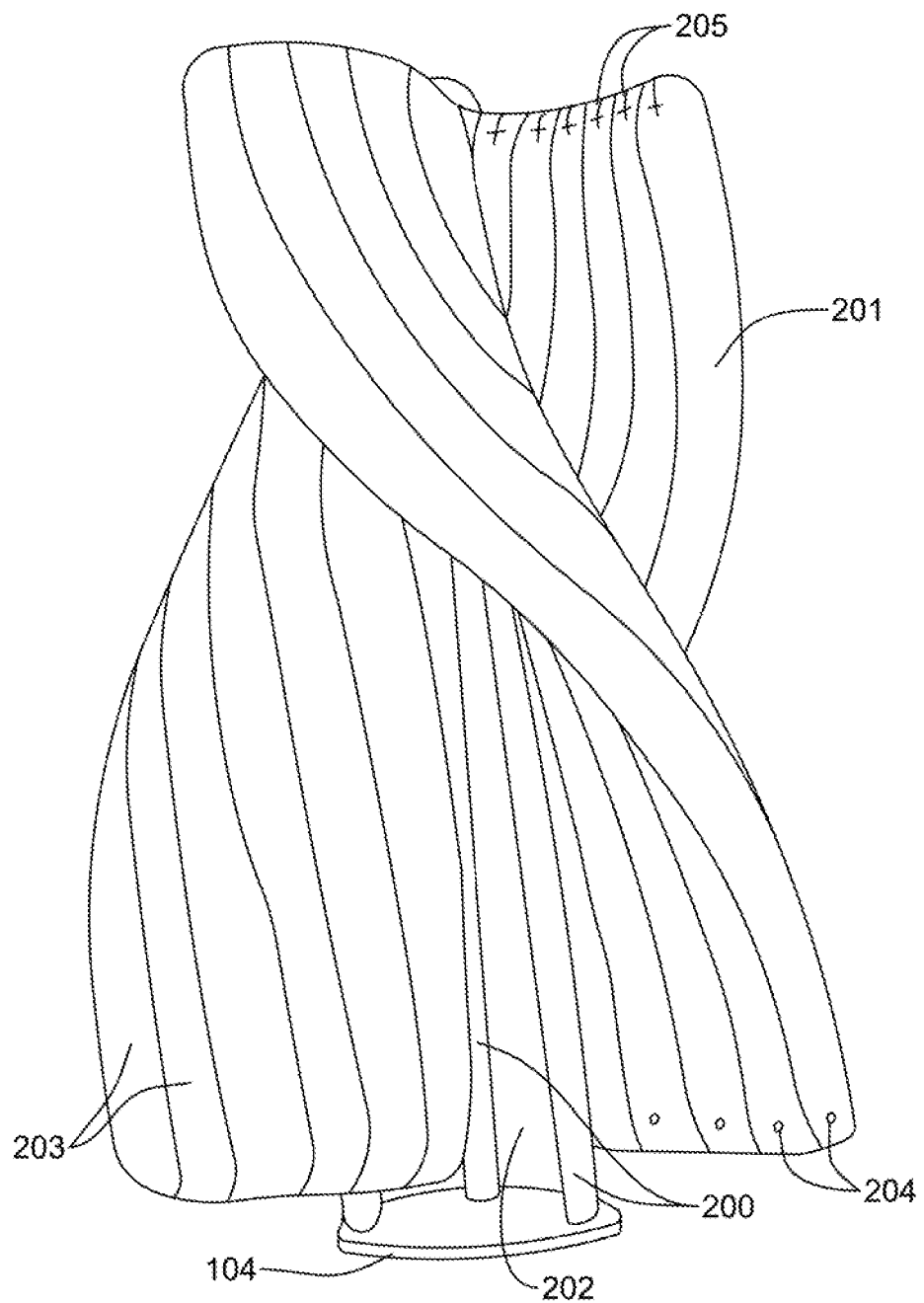
FIG. 2 is a view of one embodiment of an inflatable vertical axis wind turbine sail.

Referring to FIG. 2, in some embodiments, the inflatable vertical axis wind turbine sail may include inflatable supports 200 configured to form a tripod and at least two inflatable blades, for example, blades 201 coupled to the supports. The tripod may have openings 202 which would allow wind to vent through the center of the sail and duct the wind between the downwind and upwind blades, thereby reducing drag on the upwind blades and improving the efficiency of the inflatable vertical axis wind turbine sail. In one embodiment, the inflatable supports 200 and the blades 201 may be made from a fabric such as, but not limited to, polyethylene terephtalate fabric. In some embodiments, other materials may be used to make the inflatable supports and blades. In such embodiments, the polyethylene terephtalate fabric may be sewn to divide the blades 201 into a plurality of cells 203. Further, in such embodiments, a bladder (not shown) may be inserted inside each cell 203 in the blade 201 and the supports 200 to hold pressurized air. The bladder may be made of urethane. In some embodiments, other materials may be used to make the bladder. A fitting 204 may be coupled to each bladder to allow air to be pumped into and released from the bladder. In some embodiments, it may be desirable to fill the bladders at the top to promote even filling of the bladder. In some embodiments, it may be desirable to provide foam supports at the top of the bladder to promote even filling of the bladder. Zippers 205 may be placed in the fabric to allow for access to the bladders. However, in other embodiments, various mechanisms other than zippers may be used. The bladders may be suspended within the cells 203 and supports 200 by tying the bladder to the fabric at the top of the cells 203 and by tying the bladder to the fabric at the top of the supports 200. Alternatively, the supports 200 and blades 201 may be made out of nylon fabric that has been sealed to be air tight. The supports 200 may be coupled a platen 104.

Figure 3:
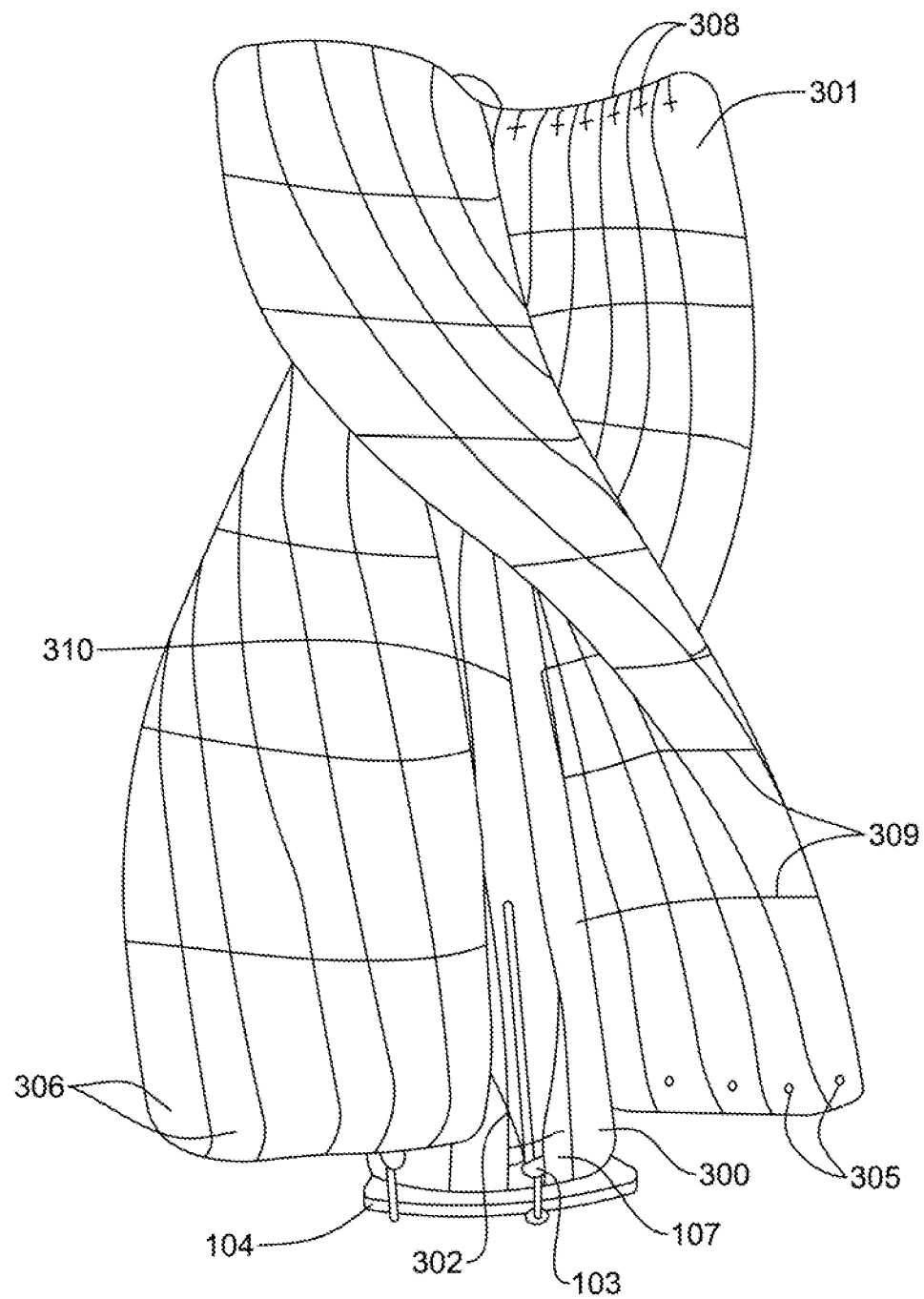
FIG. 3 is a view of one embodiment of an inflatable vertical axis wind turbine sail.

Referring to FIG. 3, rigid supports 310 may be attached to the mast 300 to prevent buckling. The rigid supports 310 may be aligned either vertically (shown) or horizontally (not shown) on the mast 300. Further, in some embodiments, rigid supports 309 may be attached to the blades 301 to prevent buckling of the blades. The rigid supports 309 may be aligned either vertically (not shown) or horizontally (shown) on the mast 300. In such embodiments, the mast 300 and the blades 301 may be made from a fabric such as, but not limited to, polyethylene terephtalate fabric. In some embodiments, other materials may be used to make the mast and blades. In such embodiments, the polyethylene terephtalate fabric may be sewn to divide the blades 301 into a plurality of cells 306. Further, in such embodiments, a bladder (not shown) may be inserted inside each cell 306 in the blade 301 and the mast 300 to hold pressurized air. The bladder may be made of urethane. In some embodiments, other materials may be used to make the bladder. A fitting 305 may be coupled to each bladder to allow air to be pumped into and released from the bladder. In some embodiments, it may be desirable to fill the bladders at the top to promote even filling of the bladder. In some embodiments, it may be desirable to provide foam supports at the top of the bladder to promote even filling of the bladder. Zippers 308 may be placed in the fabric to allow for access to the bladders. The bladders may be suspended within the cells 306 and mast 300 by tying the bladder to the fabric at the top of the cell 306 and by tying the bladder to the fabric at the top of the mast 300. Alternatively, the mast 300 and blades 301 may be made out of nylon fabric that has been sealed to be air tight. The mast 300 may be coupled a platen 104. In one embodiment, the mast 300 may have nylon webbing 302 sewn into the fabric. Clevis fasteners 103 may be bolted into the platen 104. The clevis fasteners 103 may then be coupled to the nylon webbing with a pin 107.

Figure 4:
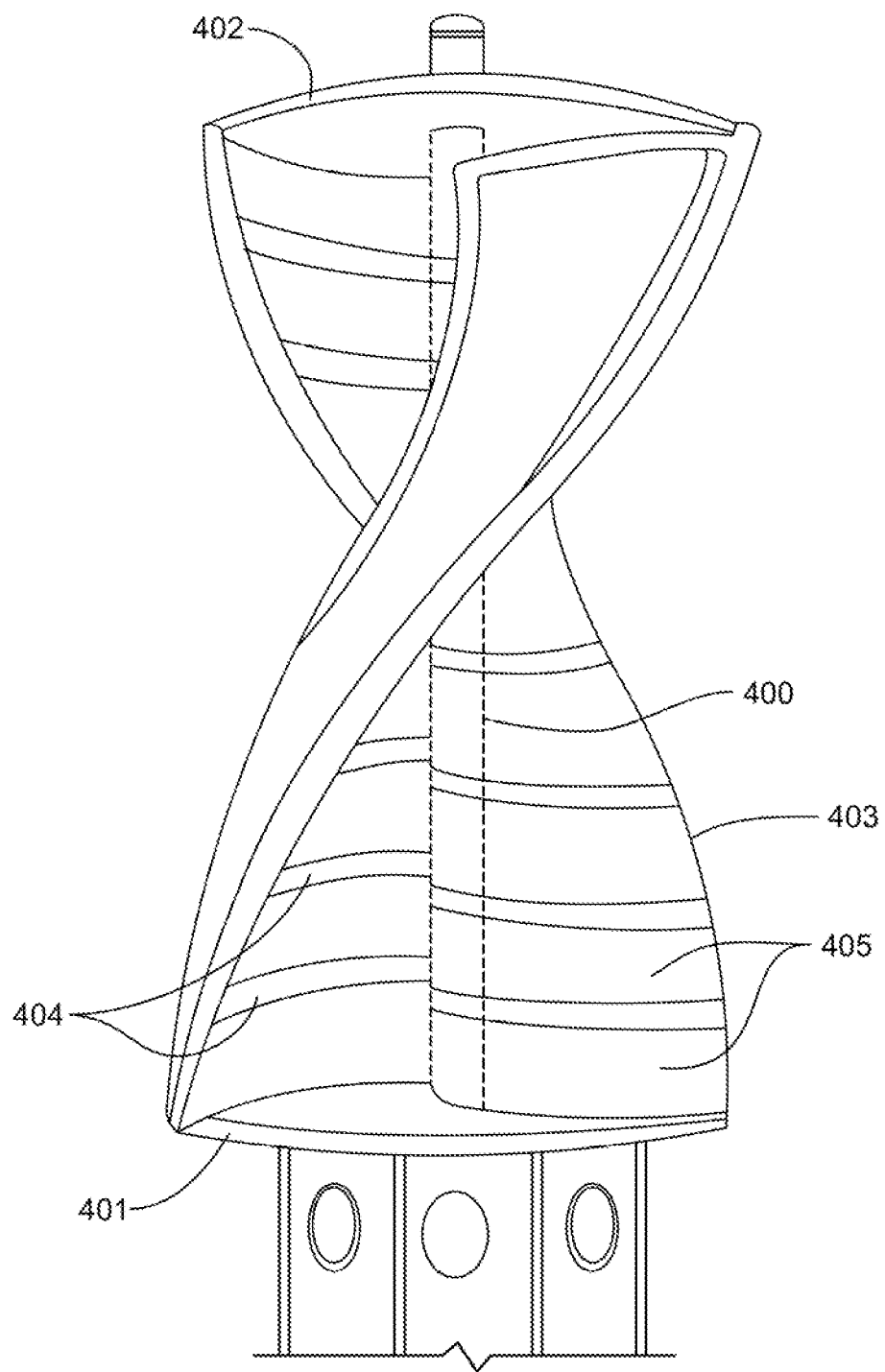
FIG. 4 is a view of one embodiment of an inflatable vertical axis wind turbine sail.

Referring to FIG. 4, the inflatable vertical axis wind turbine sail may be comprised of an inflatable mast 400, a base section 401, a top section 402, and at least two inflatable blades 403 coupled to the mast 400, base section 401 and the top section 402, wherein the mast 400 connects to the top section 402 at the first end of the mast 400 and connects to the base section 401 at the second end of the mast 400. The blades may be comprised of inflatable channels 404 with fabric sections 405 extending between the each channel 404. In one embodiment, the channels 404 in the blades are in fluid communication with the mast 401, so that air may be pumped into the mast and then flow into the channels. In another embodiment, the mast 400 and the blades 401 may be made from a fabric such as, but not limited to, polyethylene terephtalate fabric. In some embodiments, other materials may be used to make the mast and the blades. In such embodiments, a bladder (not shown) may be inserted inside each channel 404 in the blade 401 and inside the mast 400 to hold pressurized air. The bladder may be made of urethane. In some embodiments, other materials may be used to make the bladder. Alternatively, the mast 400 and blades 401 may be made out of nylon fabric that has been sealed to be air tight. The base section 401 may be coupled a platen (not shown, shown as 104 in FIG. 1).

Transmission

Figure 5:
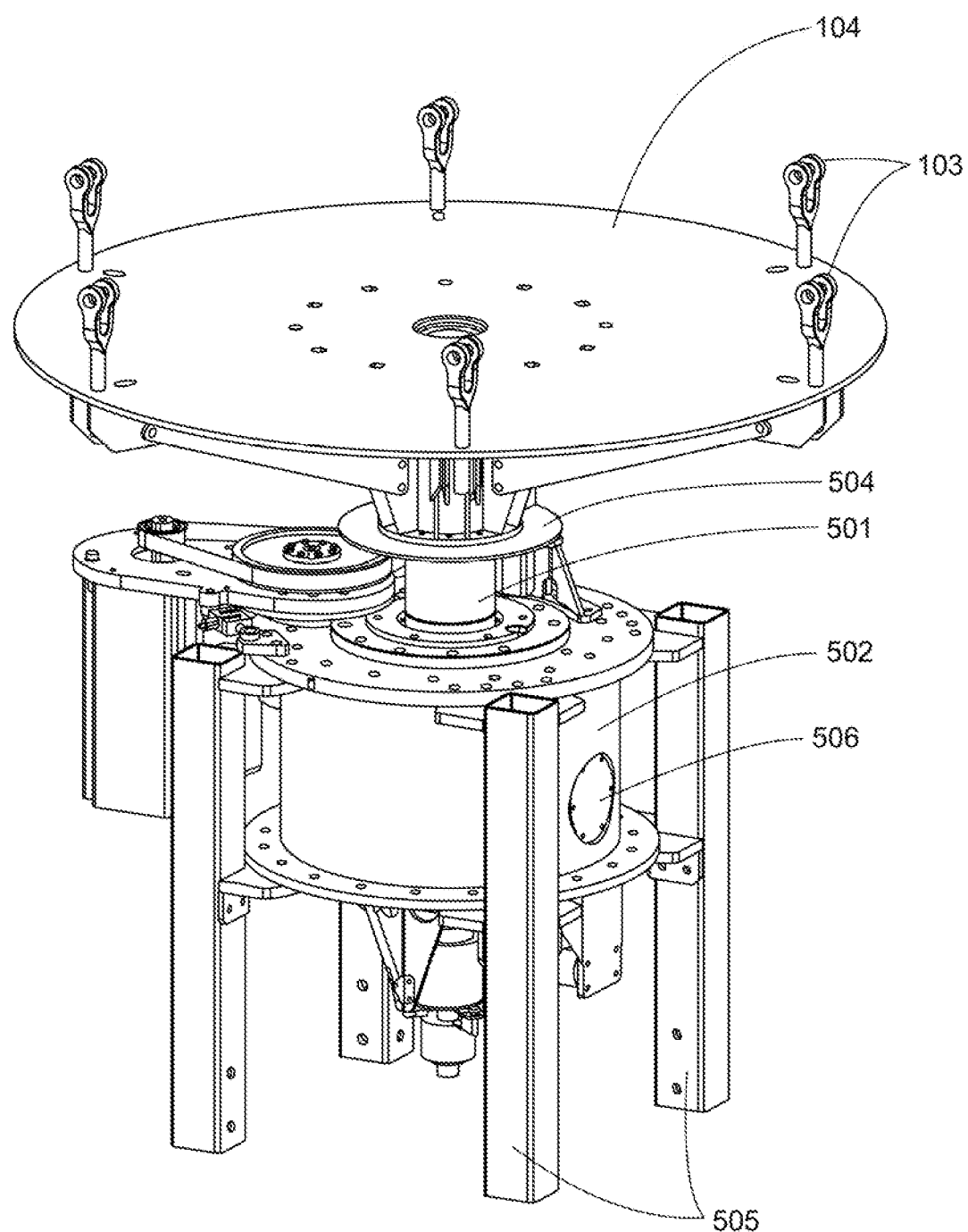
FIG. 5 is a view of one embodiment of a transmission.

Referring to FIG. 5, a perspective view of a transmission is shown. In some embodiments, the platen 104 may be coupled to the main shaft 501 of the transmission 502. In such embodiment, clevis fasteners 103 may be used to attach the inflatable vertical axis wind turbine sail (not shown, shown in FIGS. 1, 2, 3, 4, and as 1200 in FIG. 12) to the platen 104. In another embodiment, a brake disk 504 may be coupled to the main shaft 501. Support legs 505 may be attached to the transmission 502. Inspection ports 506 may be included on the transmission 502 to allow the internal components of the transmission 502 to be viewed from the outside.

Figure 6:
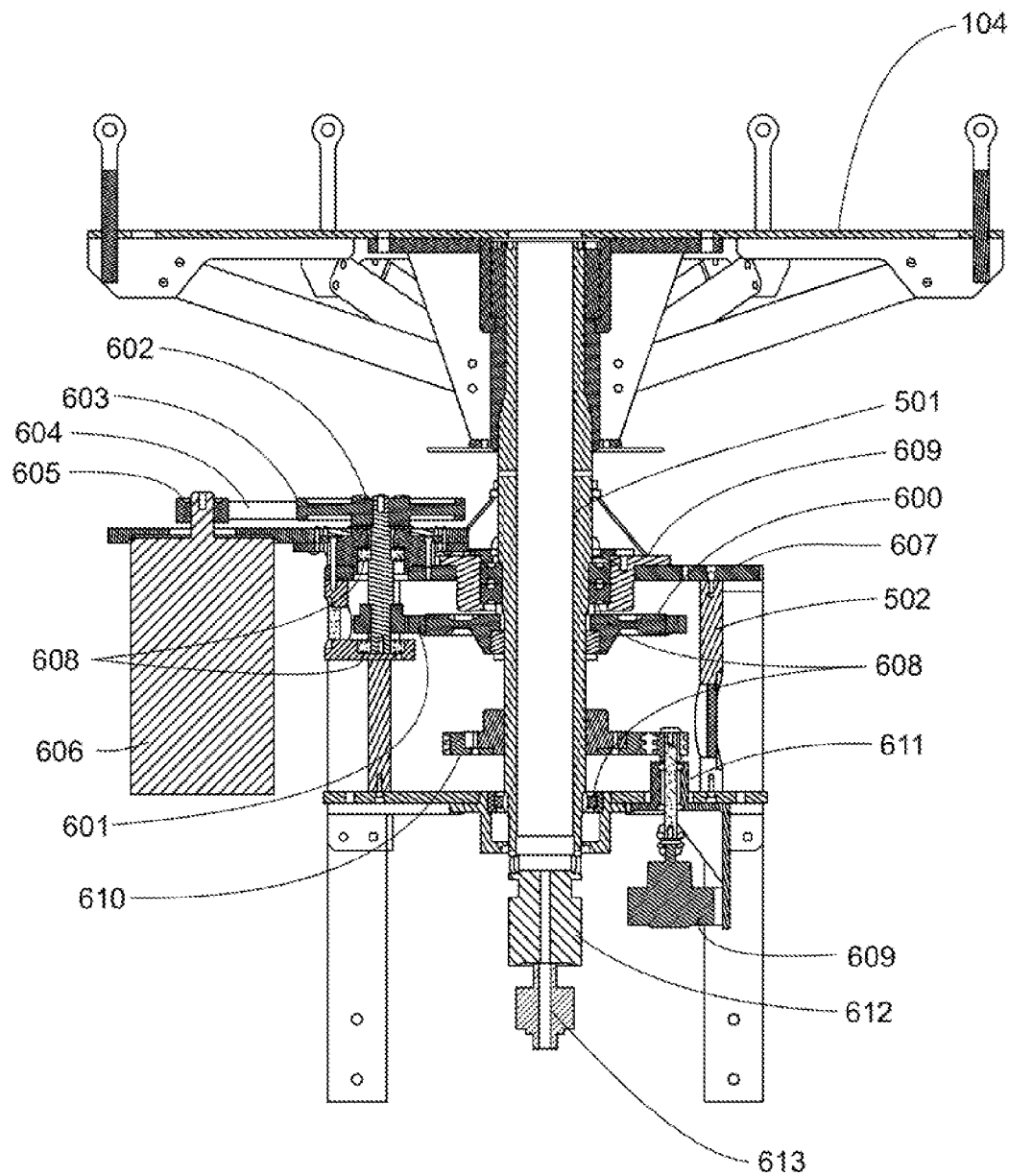
FIG. 6 is a cross sectional view of one embodiment of a transmission.

Referring to FIG. 6, an internal view of the transmission 502 is shown. The main shaft 501 may be coupled to a first stage drive gear 600. The main shaft 501 may also be rotatably coupled to the transmission case 607. Bearings 608, supported by a bearing mount 609, may be used to allow the main shaft 501 to rotate in the transmission case 607. The first stage drive gear 600 may be engaged with a pinion gear 601 which may be coupled to the first end of a pinion shaft 602. A second stage drive gear 603 may be coupled to the second end of the pinion shaft 602. The pinion shaft 602 may be rotatably coupled to the transmission case using bearings 608.

In one embodiments, the second stage drive gear 603 may be engaged with a pulley 605 coupled to a motor 606. In some embodiments, it may be desirable for the motor 606 to be a variable-speed, high-efficiency brushless permanent magnet motor such as, but not limited to, an industrial servo motor. In some embodiments, a belt 604 may be used to connect the second stage drive gear 603 to the pulley 605. As incident winds contacts the blades of the inflatable vertical axis wind turbine sail, the inflatable vertical axis wind turbine sail may rotate about the longitudinal axis of the mast. Since the mast may be coupled to the platen 104 which may be coupled to the main shaft 501, the main shaft 501 may rotate about its longitudinal axis and drive the first stage drive gear 600. In some embodiments, it may be desirable for the first stage drive gear 600 to be larger than the pinion gear 601, in order to convert the slower rotation of the blades into a quicker rotation that may be capable of driving the motor 606 and producing electricity.

In some embodiments, an oil pump 609 may be coupled to the transmission case 607 via a feedthrough 611 and configured to transmit oil to the bearing 608. The oil pump 609 may be coupled to fittings (not shown) on the main shaft bearings 608 via tubes (not shown). Oil may be pumped through the tubes and into the transmission 502. A chain sprocket 610 may be coupled to the oil pump 609 and drives the oil pump 609. The oil may flow down the bearings 608, main shaft 501, and gears and collect at the bottom of the transmission 502. The oil may then flow through fittings (not shown) in the bottom of the transmission 502 into a collection tank (not shown) where it may be pumped back into the transmission 502. In further embodiments, a pneumatic rotary joint 612 may be coupled to the transmission case 607 and the main shaft 501. In another embodiment, a blower (not shown, shown as 1207 in FIG. 12) may be connected to the pneumatic rotary joint 612. Air may be pumped through the main shaft 501 and into tubes that connect from the main shaft 501 to the fittings on the inflatable vertical axis wind turbine sail and mast so that the inflatable sail may be inflated. In yet another embodiment, valves connected in-line with the blower may be opened to deflate inflatable sail. In yet further embodiments, an electric rotary joint 613 may be coupled to the transmission case 607 and the main shaft 501. The electric rotary joint may be used to provide electricity to components such as, but not limited to, sensors, motors, strain gauges, or lighting on the inflatable vertical axis wind turbine.

Figure 7:
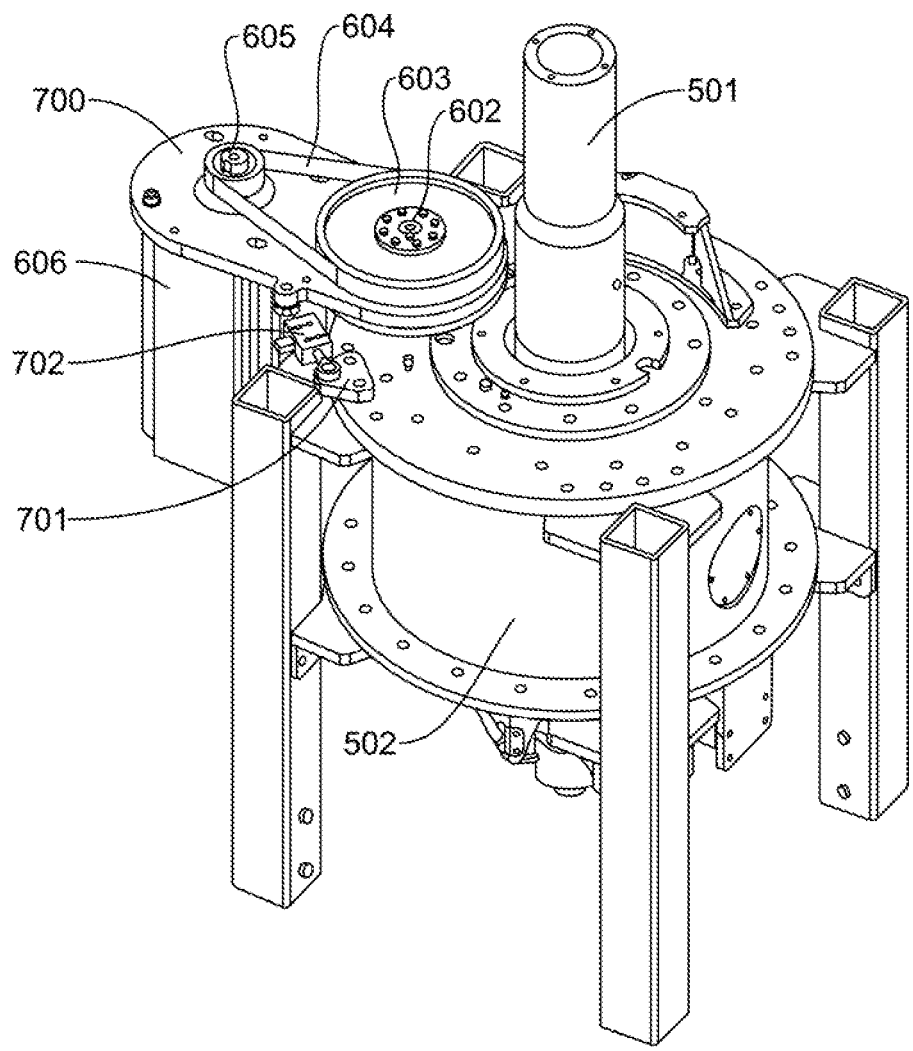
FIG. 7 is a view of one embodiment of a transmission.

Referring to FIG. 7, a perspective view of the transmission is shown. In one embodiment, a motor plate 700 may be coupled to the pinion shaft 602. In such embodiments, the motor plate 700 may be able to rotate about the longitudinal axis of the pinion shaft 602. The motor 605 may be coupled to the motor plate 700. In yet another embodiment, a bracket 701 may be coupled to the transmission 502. A strain gauge 702 may be coupled between the motor plate 700 and the bracket 701. As such when the pinion shaft 602 rotates, the motor plate 700 may experience the same torque as the pinion shaft 602. The torque on the motor plate 700 may cause it to rotate about the longitudinal axis of the pinion shaft 602. This force may be measured by the strain gauge 702 and may be used to compute the torque produced by the transmission 502. In some embodiments, this means of measuring the torque may be desirable, since it may be relatively inexpensive, since it may require fewer parts than other means of measuring torque. Moreover, since the strain gauge may be outside the transmission and not coupled directly to the main shaft, the strain gauge may be easily replaced if parts fail. Measuring the torque prior to the motor 606 also eliminates the need to assess the effects of the inefficiencies of the motor in the mechanical power computations for the inflatable vertical axis wind turbine. Note that this does not preclude the used of other methods of measuring torque such as, but not limited to, using strain gauges coupled directly to the main shaft or using pressure sensors coupled between the gears to measure the force between the teeth of the gears.

Figure 8:
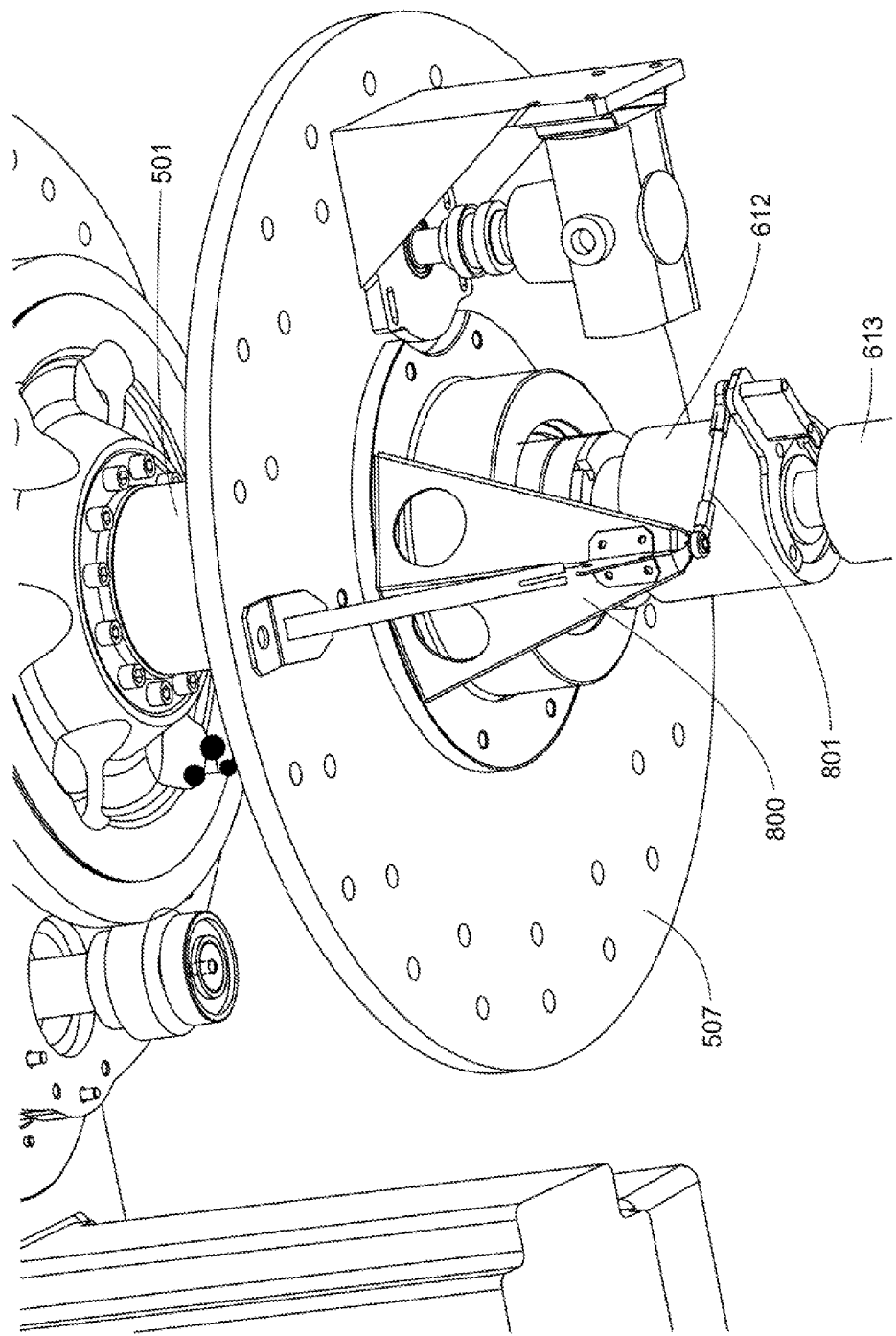
FIG. 8 is a view of one embodiment of a brake.

Referring to FIG. 8, a bottom view of the transmission is shown. In one embodiment, a bracket 800 may coupled to the pneumatic rotary joint 612 and electrical rotary joint 613 to keep the pneumatic rotary joint 612 and electrical rotary joint 613 stationary while the main shaft 501 may be rotating. The bracket 800 may be coupled to the pneumatic rotary joint 612 and electrical rotary joint 613 via a threaded rod 801. The bracket 800 may also be coupled to the transmission casing 507.

Figure 9:
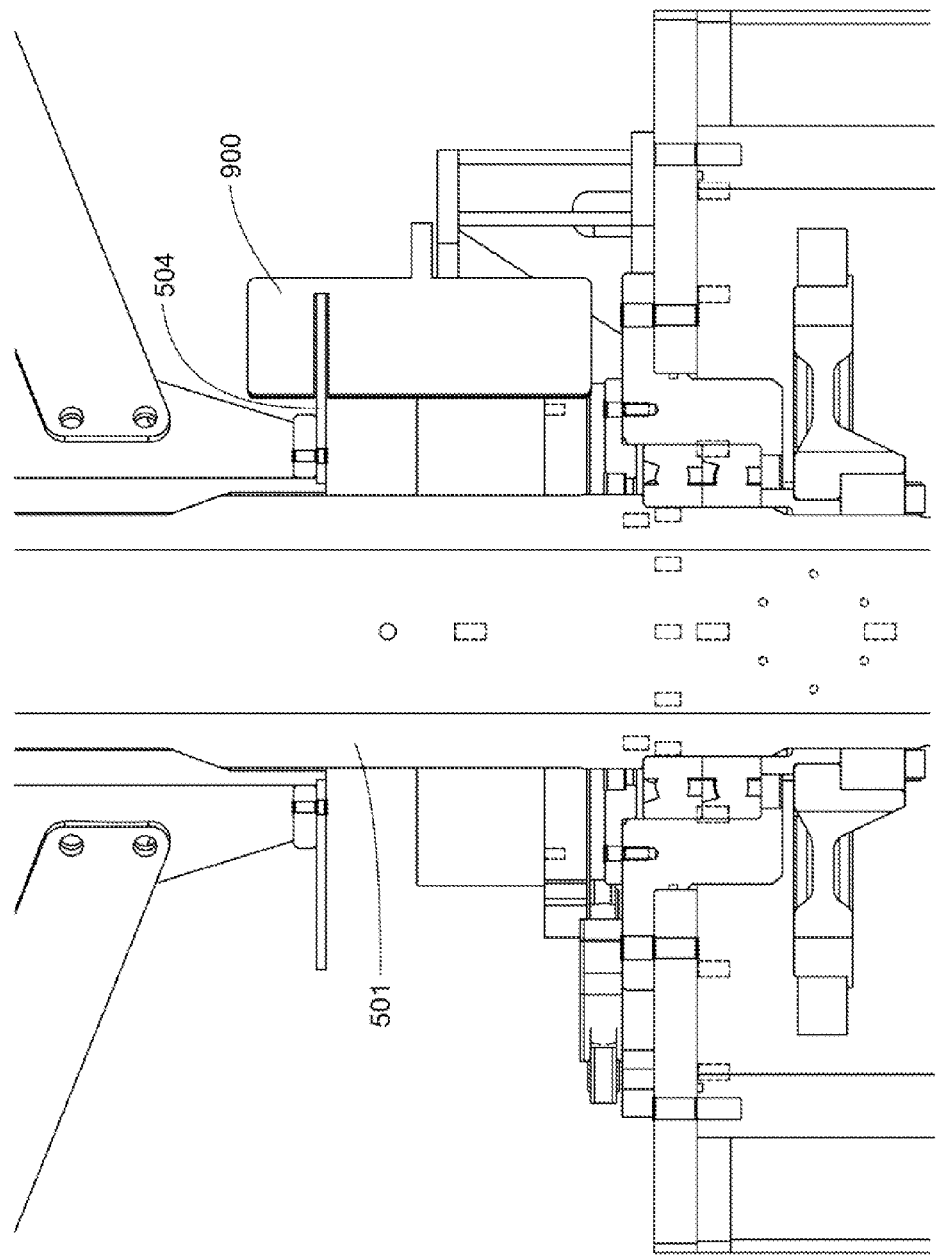
FIG. 9 is a cross sectional view of one embodiment of a transmission.

Referring to FIG. 9, a cross section of the brake disk 504 and main shaft 501 are shown. In other embodiments, a hydraulic caliper brake 900 may be provided to control the speed of the main shaft. The hydraulic caliper brake 900 may be coupled to an air compressor (not shown, shown as 1219 in FIG. 12) and held open or closed by compressed air. However, the hydraulic caliper brake 900 may also be coupled to a hydraulic power unit 1222 (not shown, shown as 1222 in FIG. 12). Therefore, the brake 900 may be actuated by the air compressor 1219 and/or the hydraulic power unit 1222. In other embodiments, the brake 900 may be actuated by an electronic actuator. A solenoid valve (not shown, shown as 1220 in FIG. 12) may be used to regulate the air pressure from the air compressor. In some embodiments, it may be desirable to have the hydraulic caliper brake 900 configured to be in the closed position when the solenoid valve is closed (or in other words the brake may be held in the open position by the compressed air when the solenoid is opened), so that if power is lost to the solenoid valve when the system is running, the hydraulic caliper brake 900 may engage the brake disk 504 and stop the main shaft 501. In some embodiments, it may be desirable to have the brake disc 504 and hydraulic caliper brake 900 located on the main shaft 501. If, for example, the hydraulic caliper brake was located on the motor and the belt connecting the second stages drive gear and the pulley were to fail, then the hydraulic caliper brake would no longer be able to stop the inflatable vertical axis wind turbine sail. By placing the brake disc 504 on the main shaft 501, the main shaft 501 may be stopped, regardless of whether other components such as gears or belts have failed. Note that this does not limit the use of the hydraulic caliper brake to only the main shaft and the hydraulic caliper brake may be used at other locations on the transmission or on the motor.

Mobile Transportation

Figure 10:
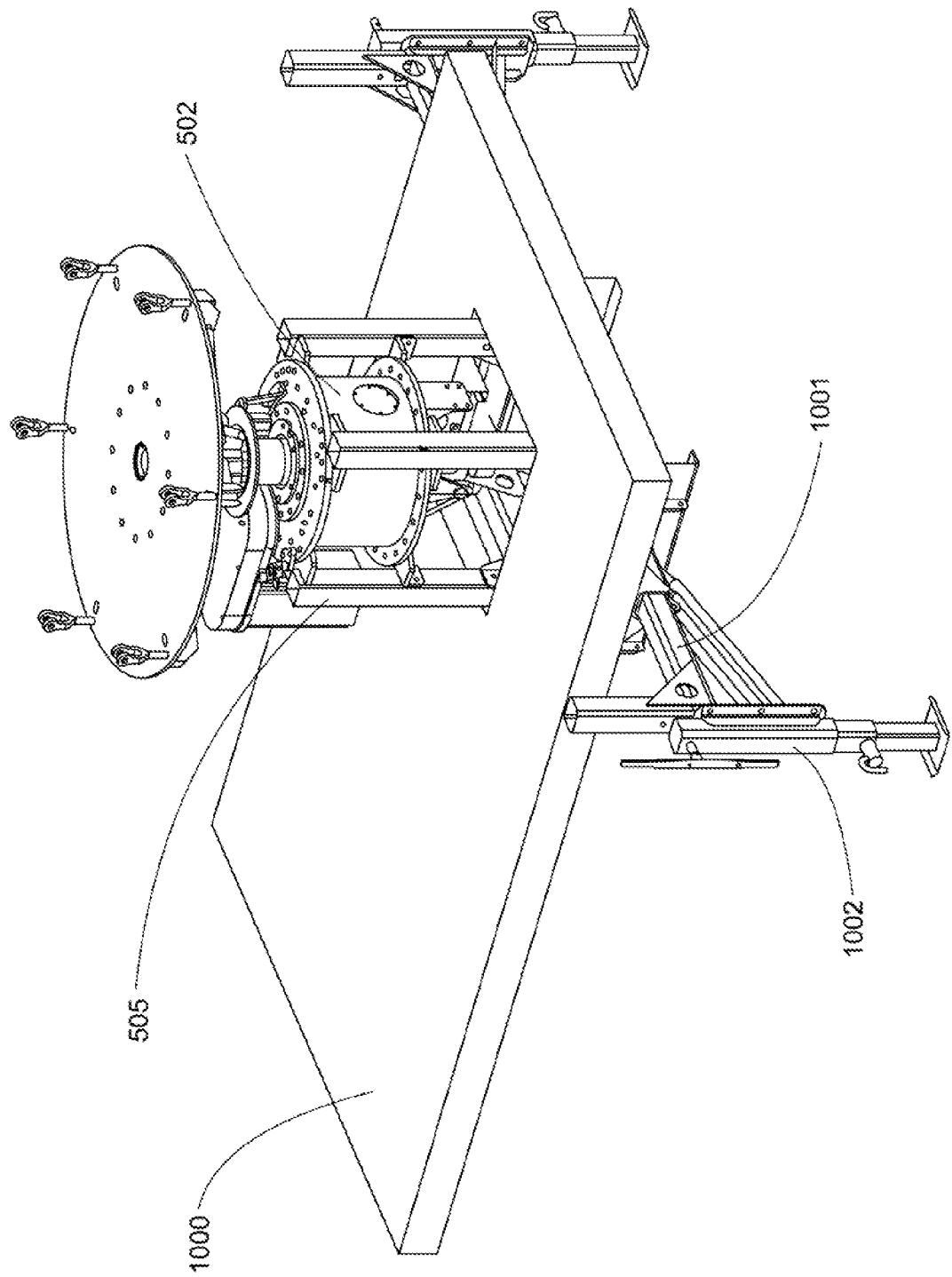
FIG. 10 is a view of one embodiment of a transmission on a platform.
Figure 11:
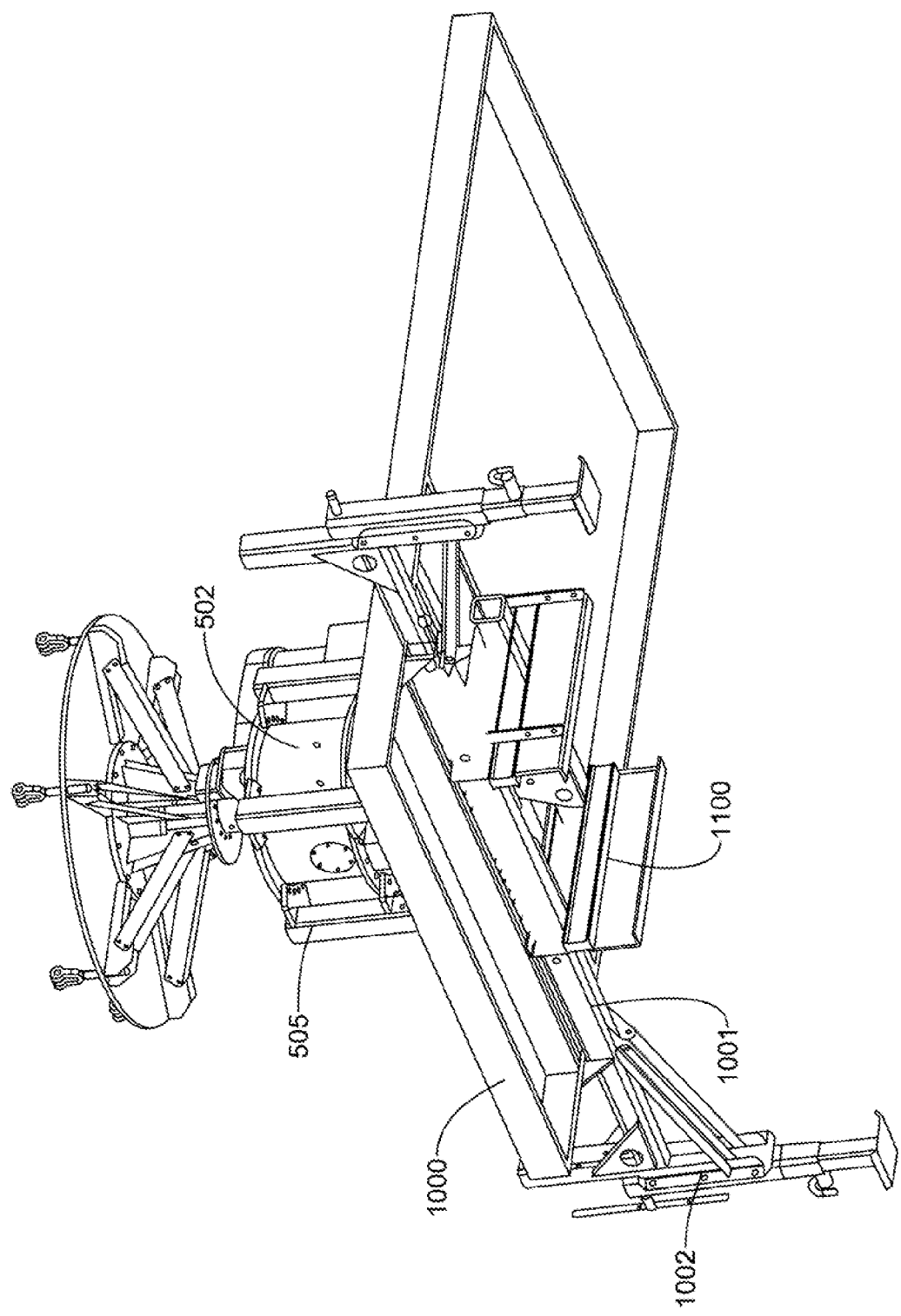
FIG. 11 is a view of one embodiment of a transmission on a platform.
Figure 12B:
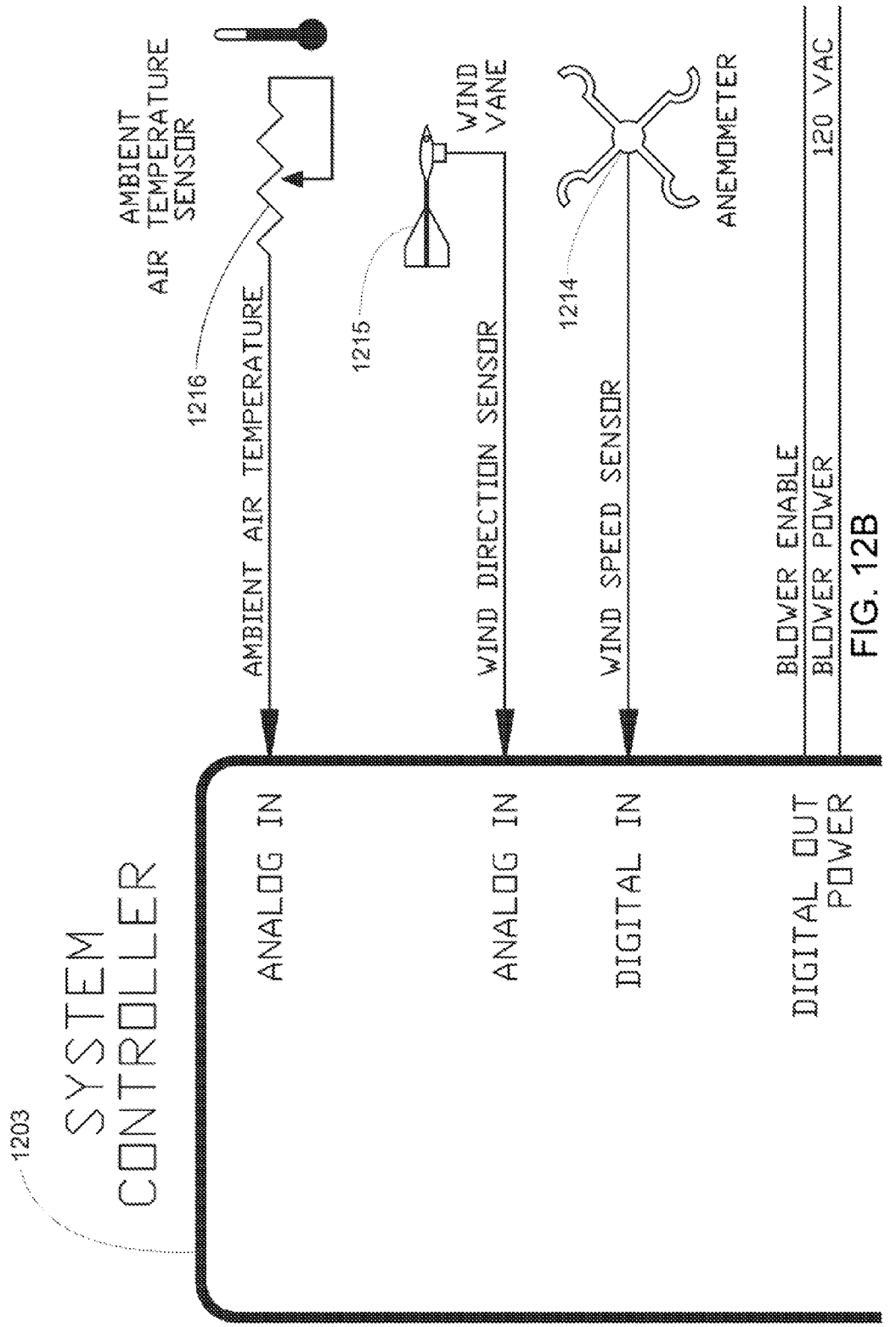
FIGS. 12A-12O show a diagram of one embodiment of an inflatable vertical axis wind turbine and a control system for the inflatable vertical axis wind turbine.
Figure 12C:
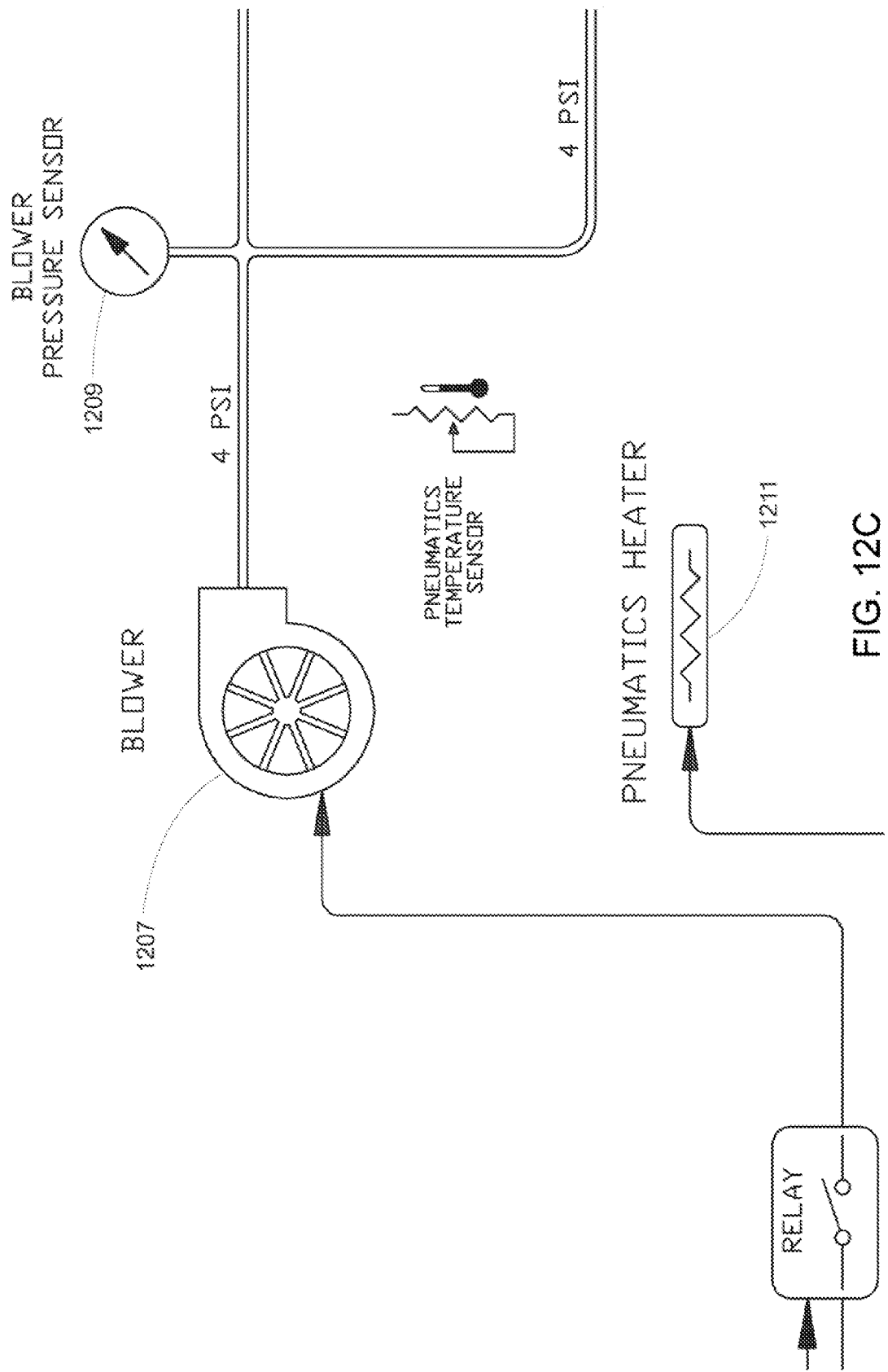
Figure 12D:
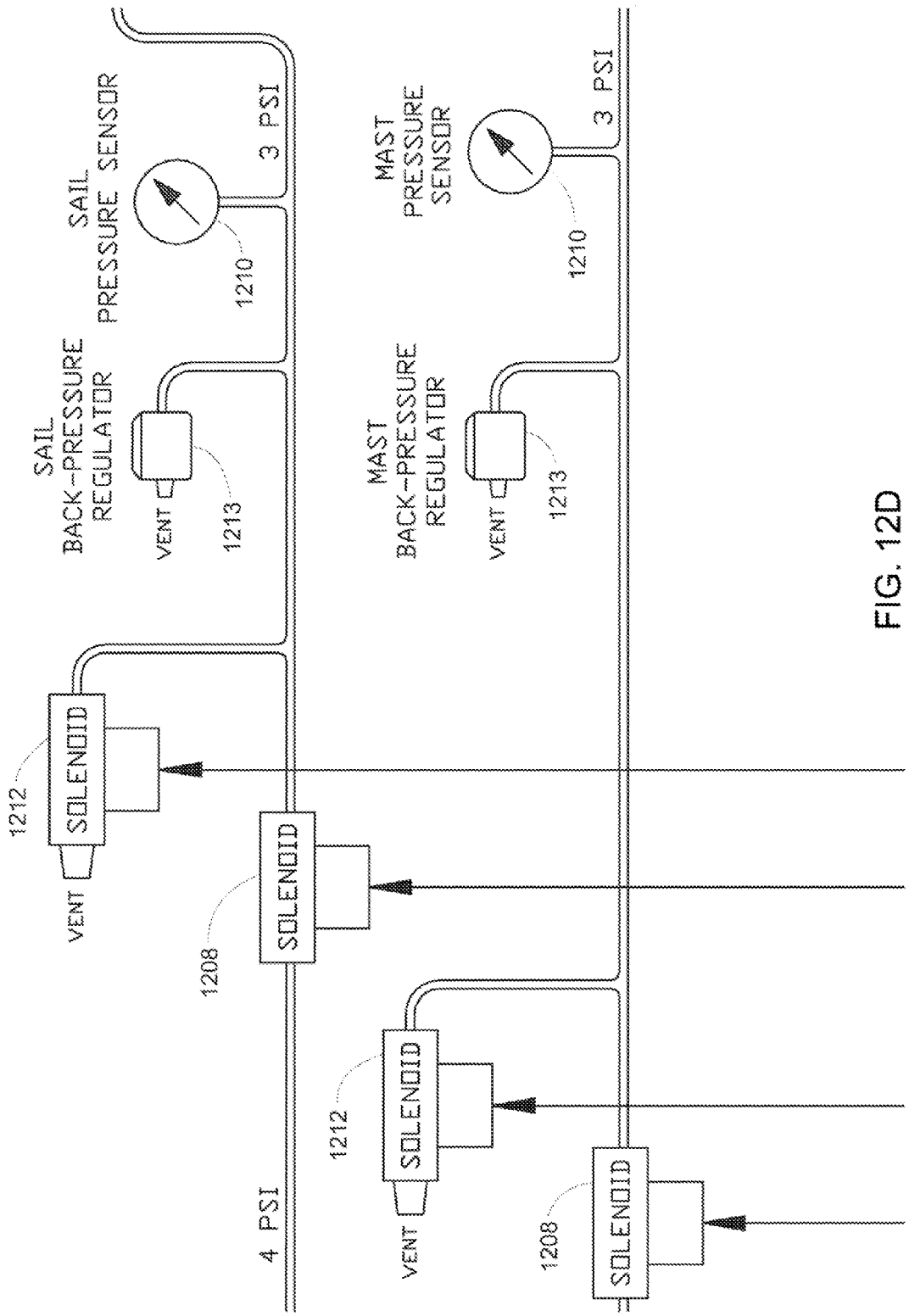
Figure 12E:
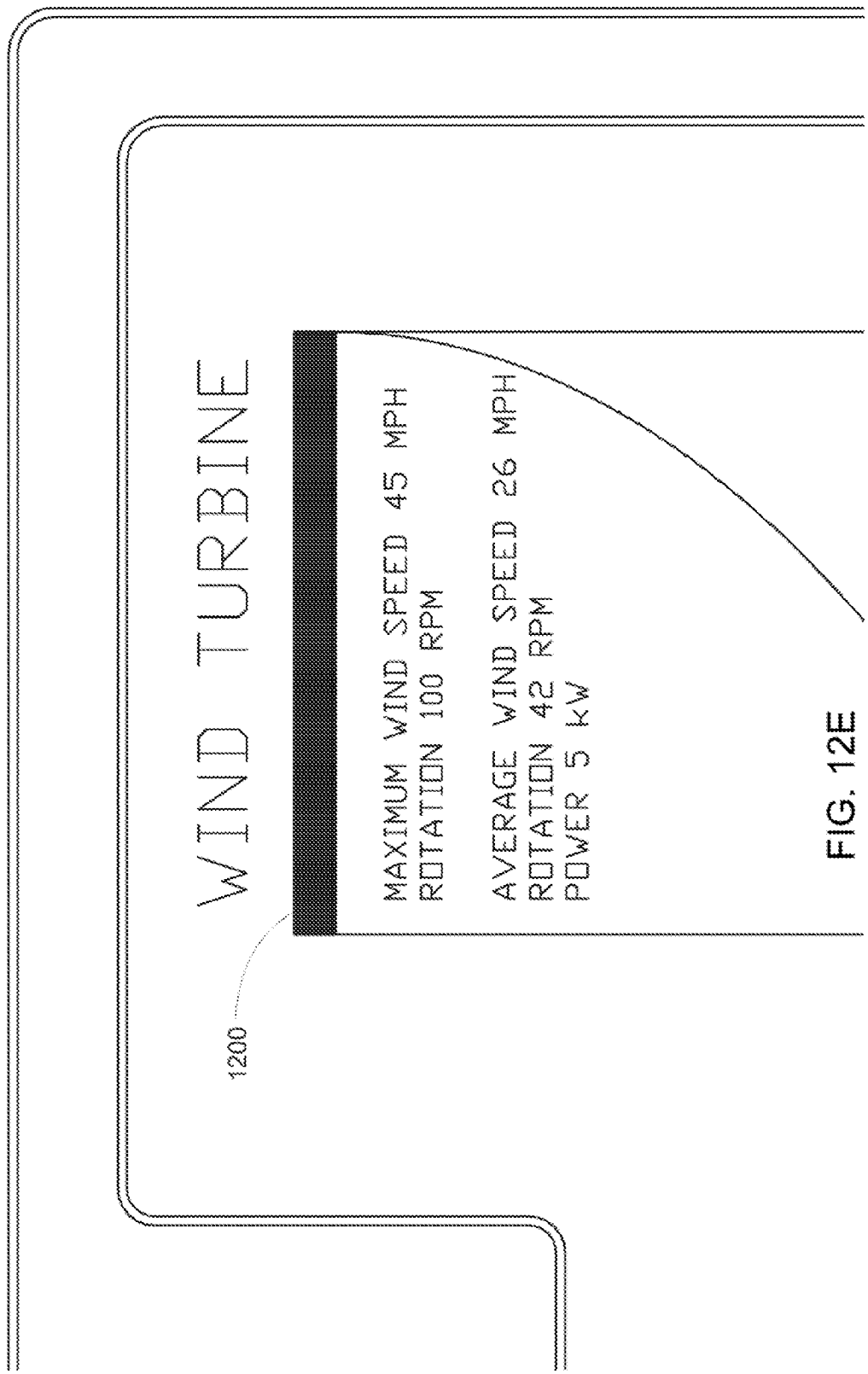
Figure 12F:
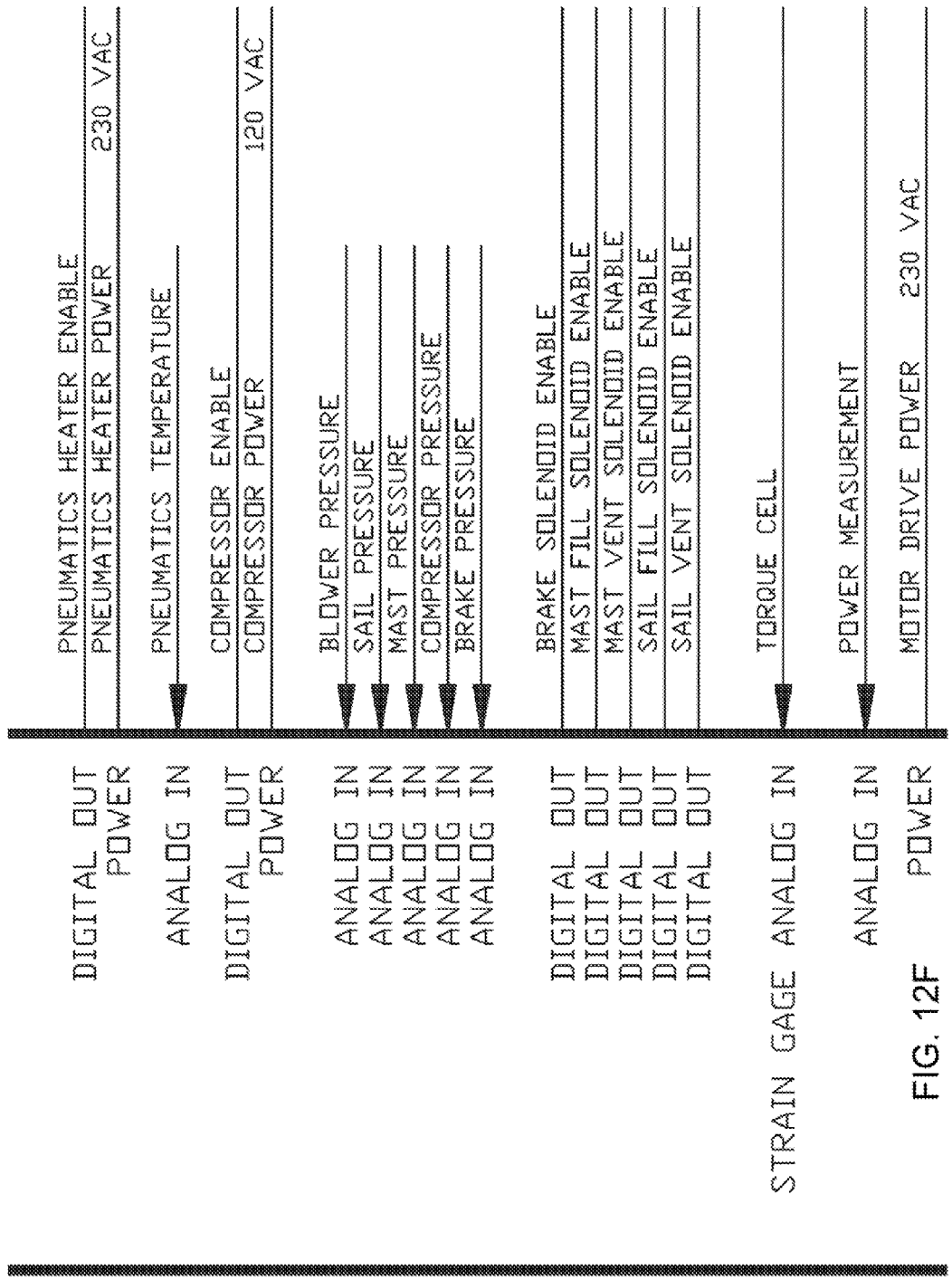
Figure 12G:
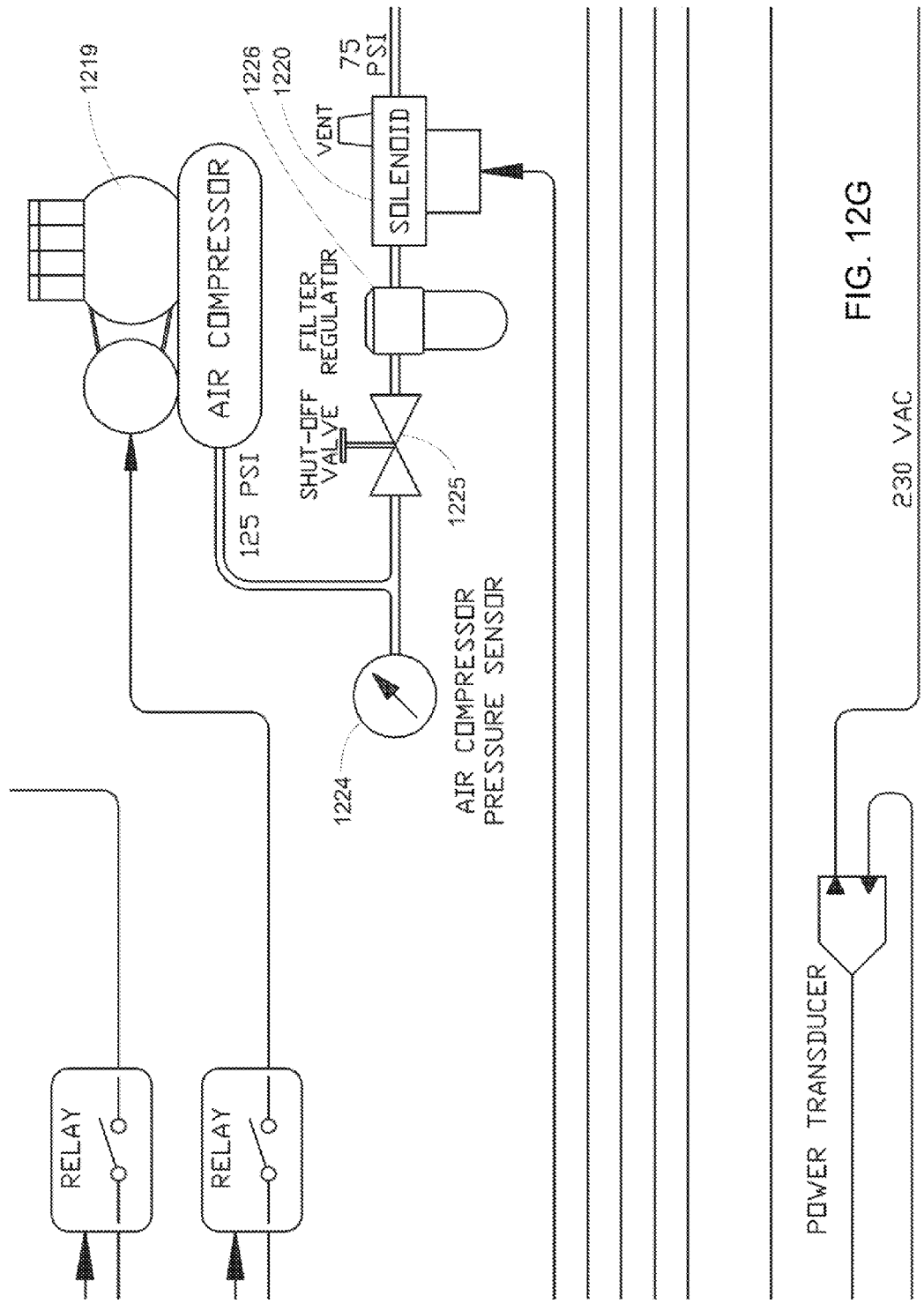
Figure 12H:
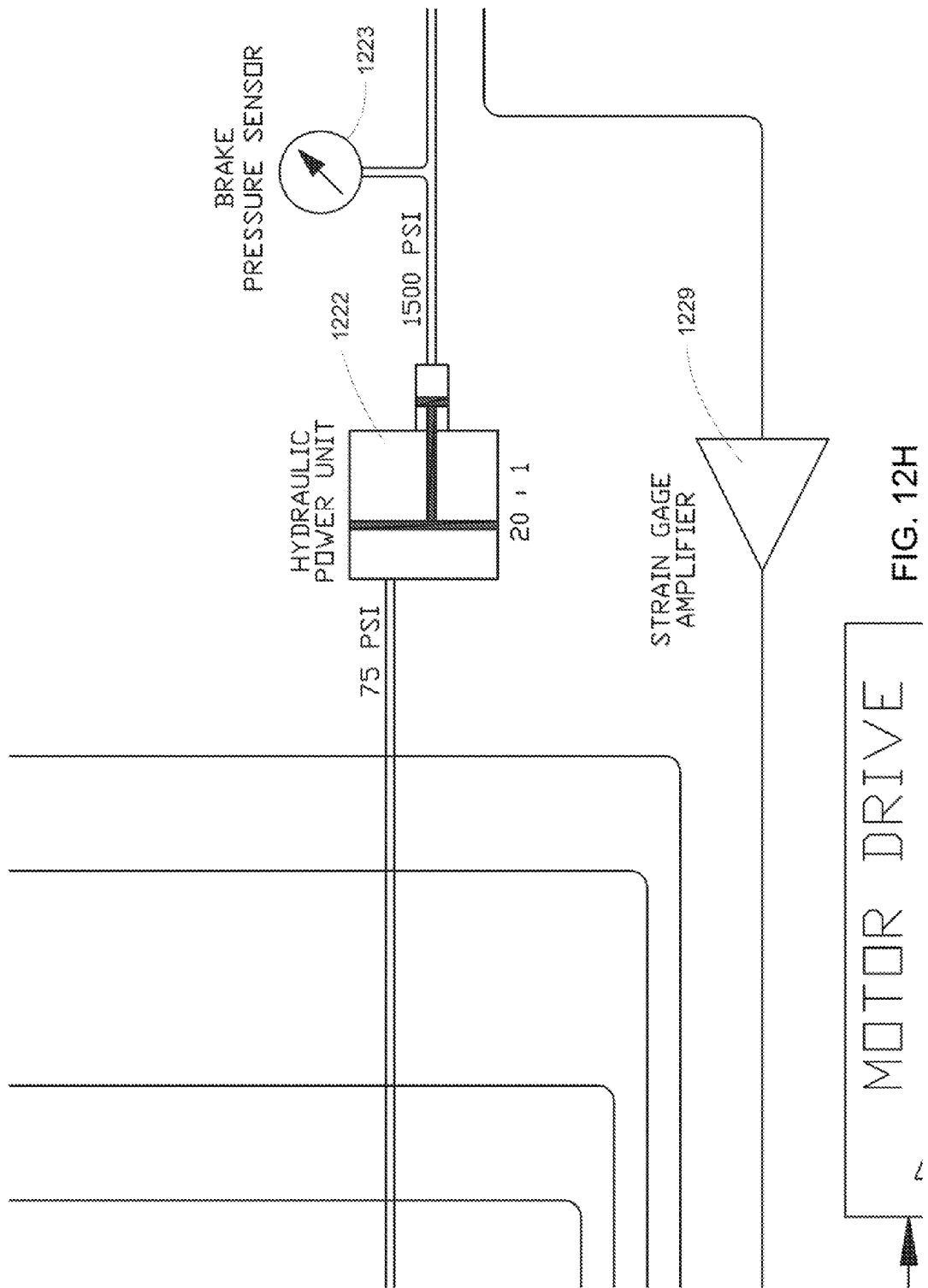
Figure 12J:
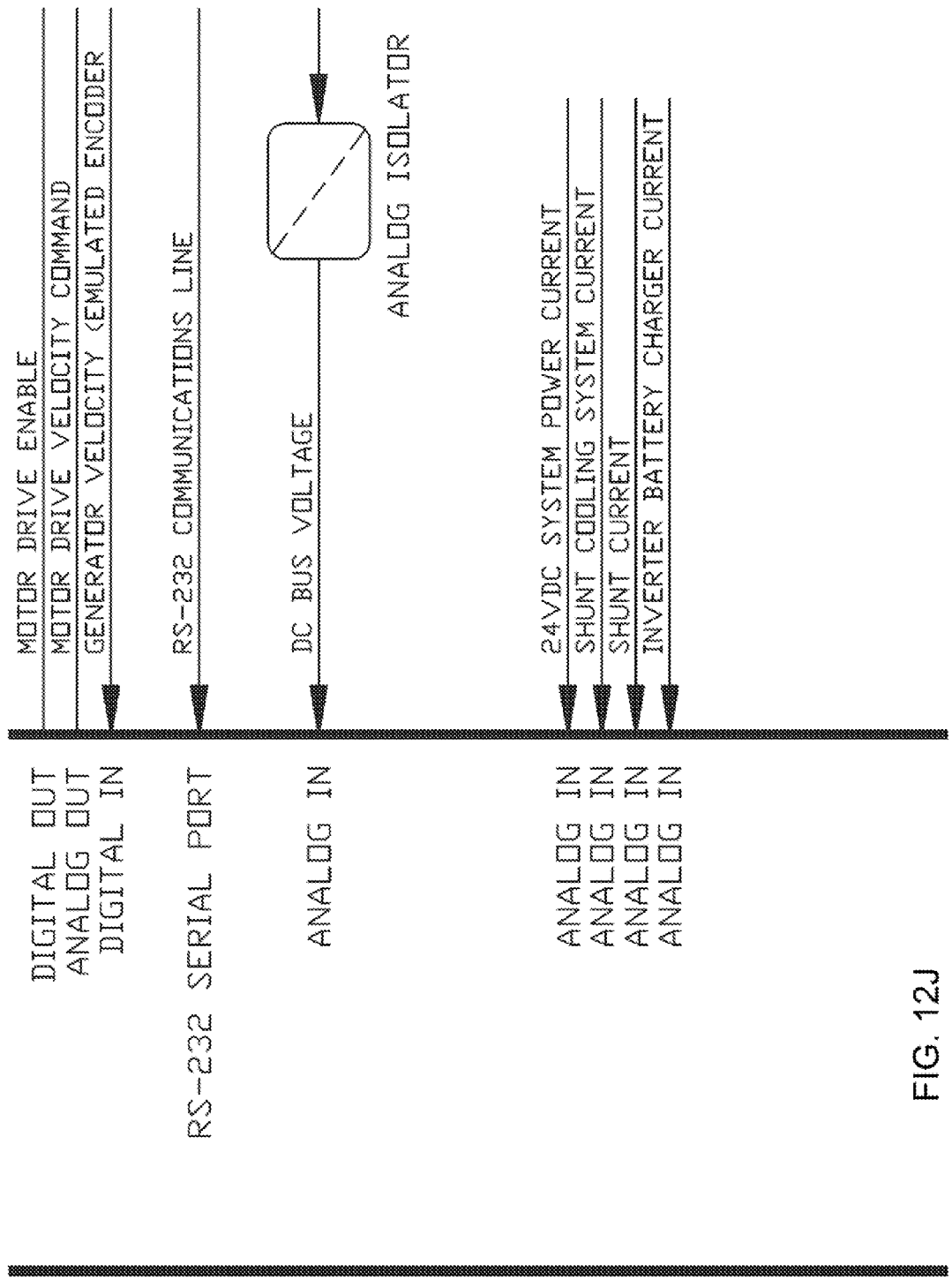
Figure 12K:
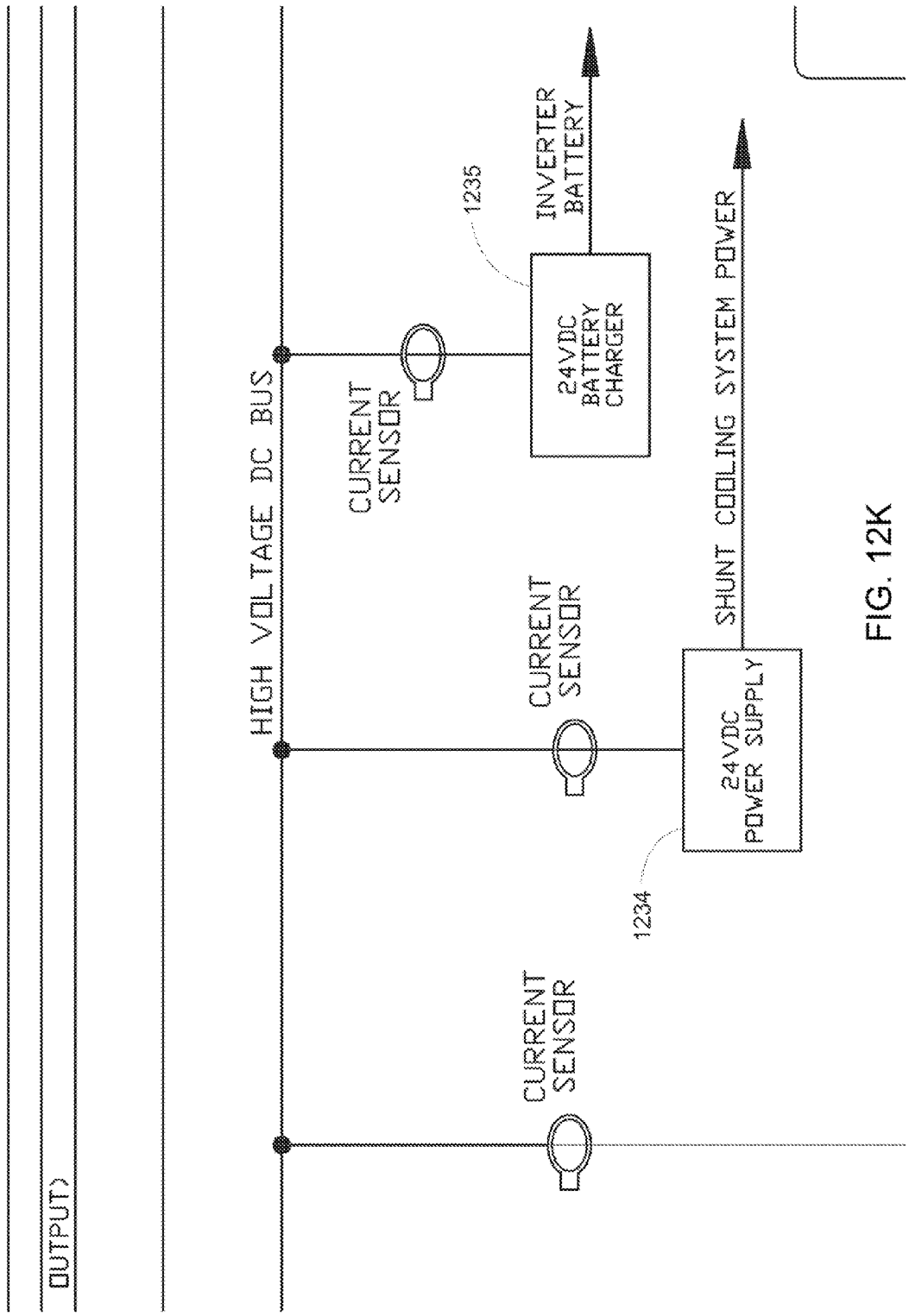
Figure 12L:
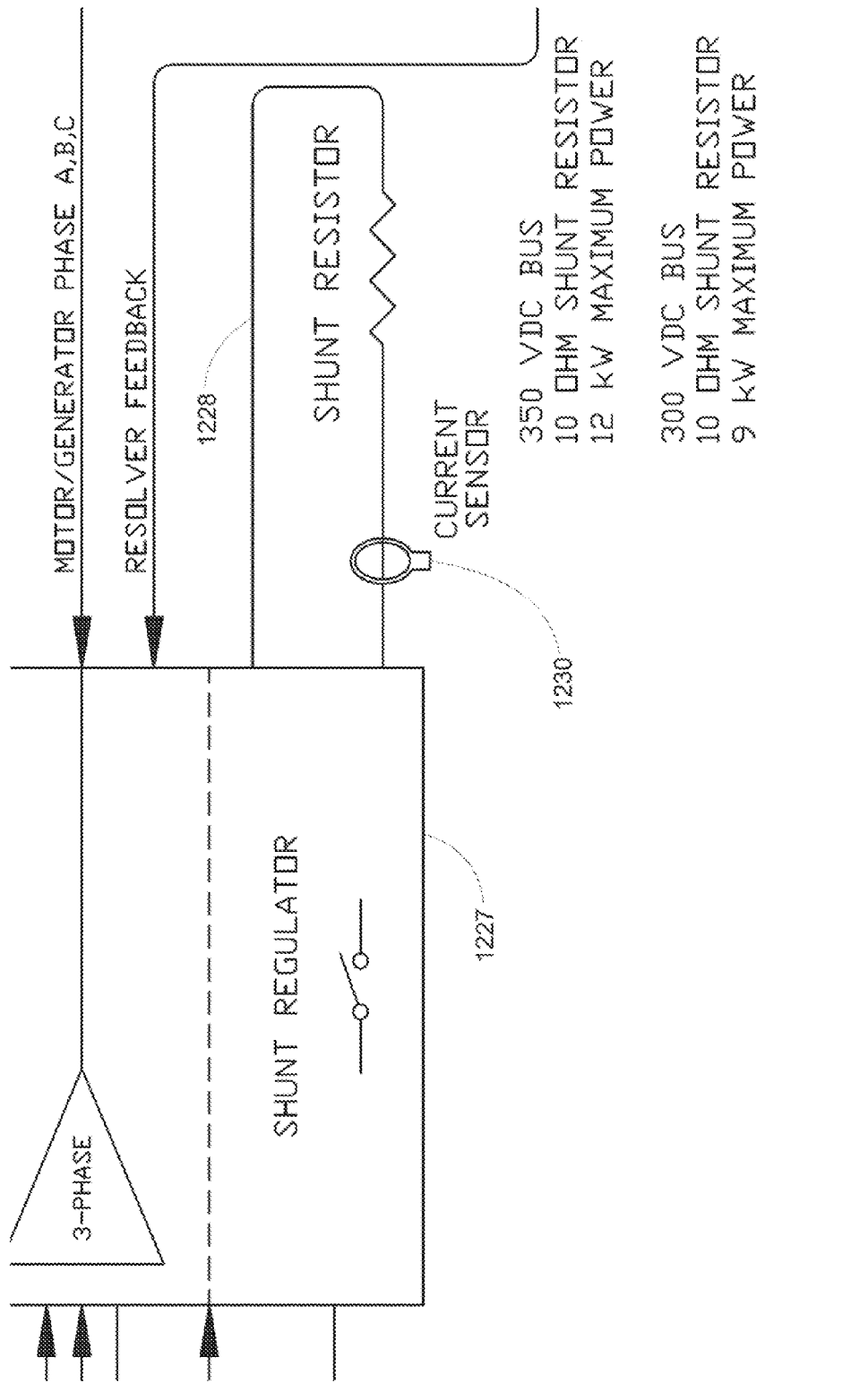
Figure 12N:
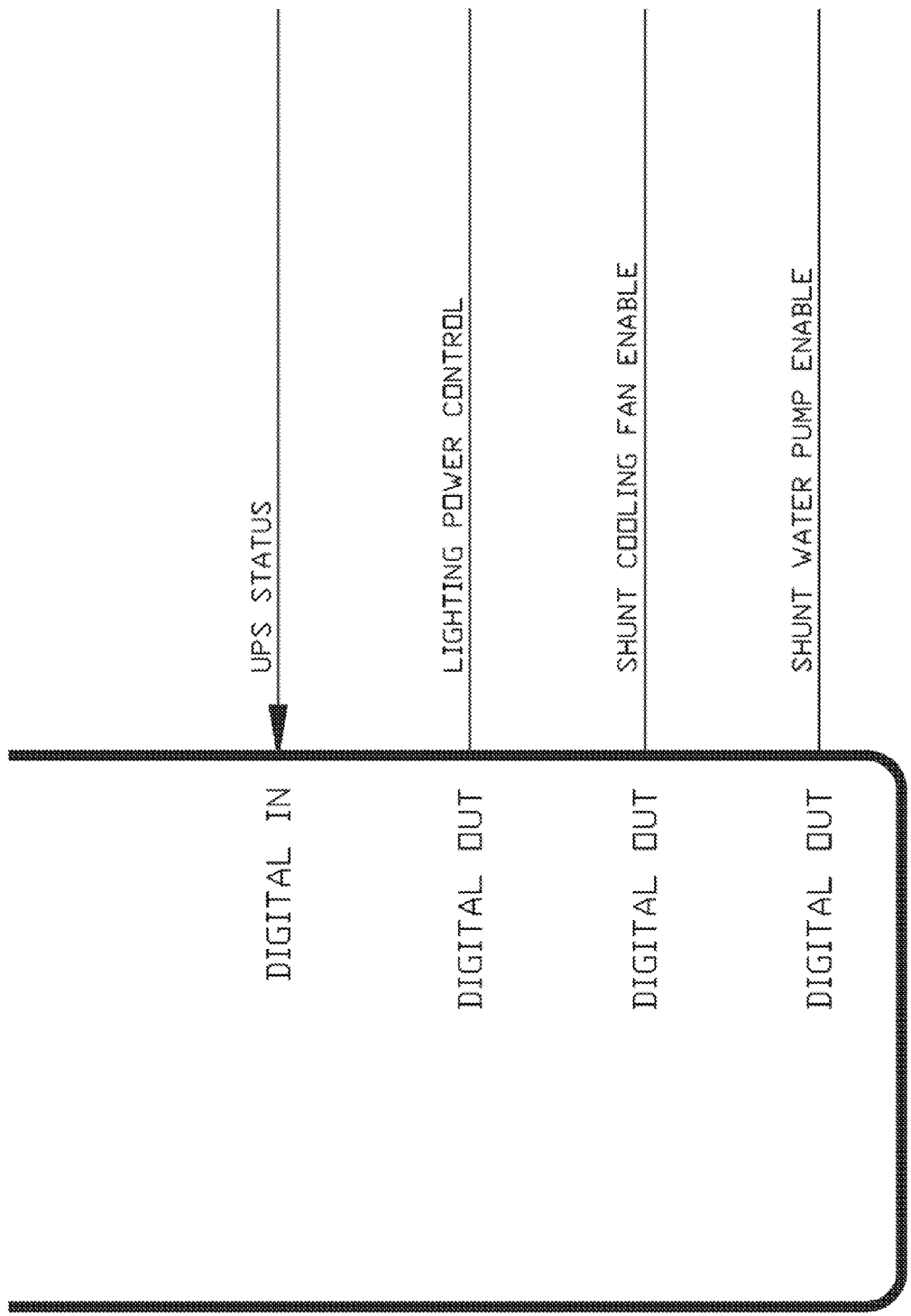
Figure 12O:
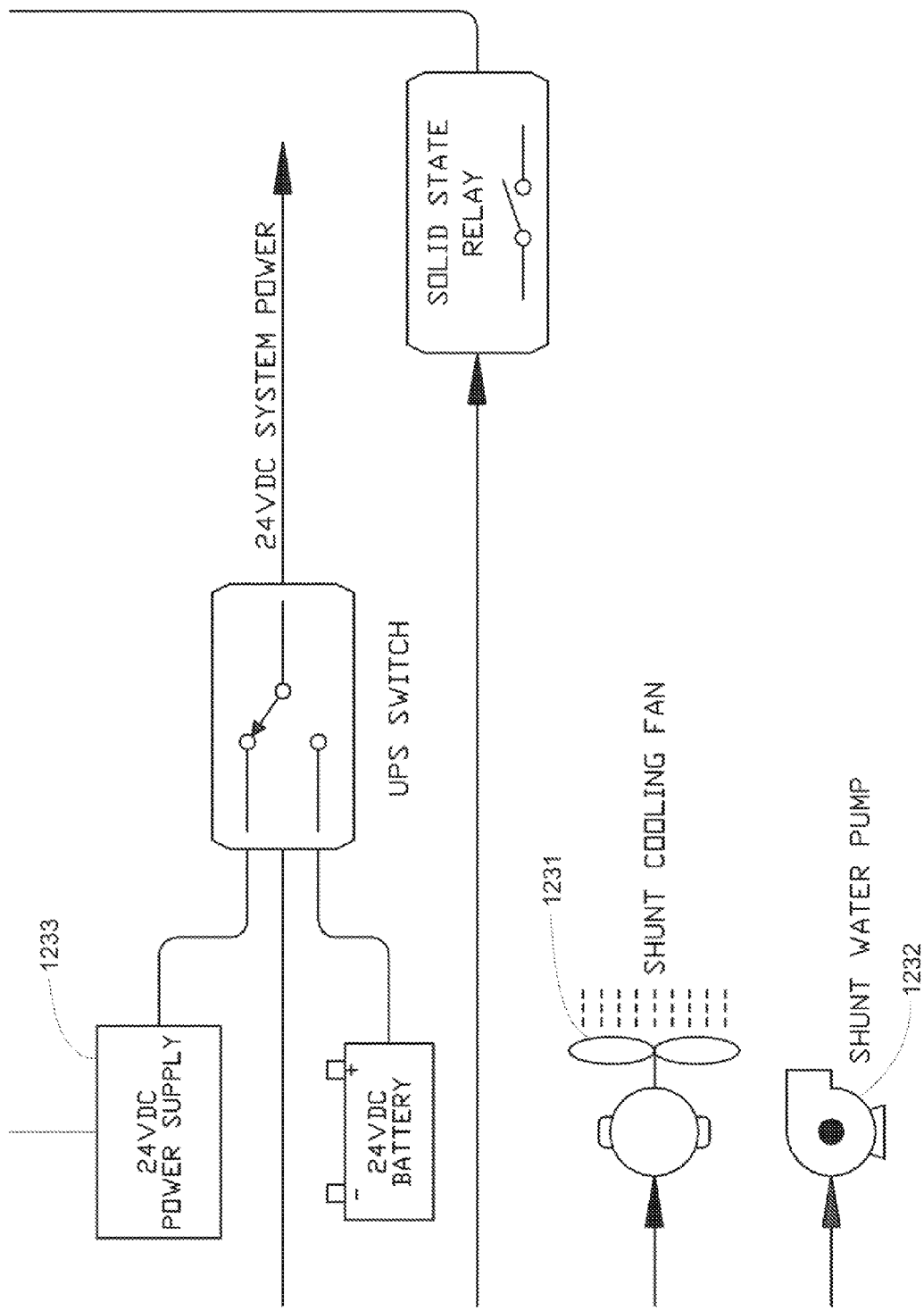

Referring to FIG. 10, the transmission 502 may be coupled to a platform 1000. In some embodiments, the platform may be the frame of a vehicle such as, but not limited to, a truck. Alternatively, the platform may be the frame of a trailer. To support and stabilize the platform, outriggers 1001 may be coupled to the 1000 platform. In some embodiments, it may be desirable to have adjustable platform legs 1002 coupled to the outriggers to increase the stability of the platform 1000. Leg supports 505 on the transmission 502 may be coupled to the platform. Alternatively the leg supports 505 may be coupled to the outriggers 1001. Referring to FIG. 11, the outriggers 1001 may be directly coupled to the frame 1100 of the platform 1000.

Control System

Referring to FIG. 12, an inflatable vertical axis wind turbine and a system for controlling the inflatable vertical axis wind turbine is provided. In one embodiment, the inflatable vertical axis wind turbine 1200 may be rotatably coupled to a transmission 1201. A load cell 1202 may coupled to the transmission and configured to measure the torque output of the transmission and send the torque measurement data to the system controller 1203. The system controller may be a cRIO controller made by National Instrument, Inc. A strain gauge amplifier 1229 may be used to amplify the signal sent from the load cell 1202 to the system controller. The transmission 1201 may also be rotatably coupled to a brushless permanent magnet motor 1204. As incident winds contact the blades of the inflatable vertical axis wind turbine 1200, the inflatable vertical axis wind turbine 1200 rotates. Since the inflatable vertical axis wind turbine 1200 may coupled to the transmission 1201 which in turn may be coupled to the motor, the rotation of the inflatable vertical axis wind turbine 1200 may drive the brushless permanent magnet motor 1204 which produces electricity.

A pneumatic rotary joint 1205 may be coupled to the transmission 1201. In another embodiment, a blower 1207 may be connected to the pneumatic rotary joint 1205. Air may be pumped through the pneumatic rotary joint 1205 and into the inflatable vertical axis wind turbine 1200. The air may be regulated by inline solenoid valves 1208, based on pressure readings from a blower pressure sensor 1209 and pressures sensors for the inflatable vertical axis wind turbine 1200. In one embodiment, the blower 1207 provides air to the blades and the mast of the inflatable vertical axis wind turbine 1200. The solenoid valves 1208 may be controlled via the system controller 1203 to fill the blades and the mast at different pressures with different solenoid valves 1208 to control air flow into each. In such embodiments, the system controller 1203 may be programmed to fill the mast with air first and then fill the blades. Alternatively, the system controller 1203 may be programmed to fill the mast and the blades simultaneously. In another embodiment, the blades and the mast may be filled to the same pressures. A heater 1211 may be provided to heat the enclosure housing, i.e., the housing for the pneumatics/hydraulics system. The heater 1211, in some embodiments, heats the solenoids 1208, 1212 and 1220, pressure regulators 1213, 1226 and hydraulic power unit 1222.

In yet another embodiment, solenoid valves 1212 may be opened to release air from the inflatable vertical axis wind turbine 1200. Further, back-pressure regulators 1213 may be used to release the pressure mechanically into the atmosphere when the pressure exceeds a threshold pressure for the regulator. In some embodiments, the blower 1207 may be used to release air from the inflatable vertical axis wind turbine 1200.

An anemometer 1214 may be provided to measure wind speed. In yet another embodiment, a wind vane 1215 may be provided to measure the directionality of the wind. In further embodiments, a temperature sensor 1216 may be used to measure the ambient air temperature. The ambient air temperature may be used to compute air density. Since air density affects the calibration of the anemometer 1214, and power output of the inflatable vertical axis wind turbine 1200, the temperature measurement may be used to recalibrate anemometer to correct for changes in ambient air temperature.

In yet further embodiments, an electrical rotary joint 1206 may be coupled to the transmission 1201. The system controller 1203 may be communicatively coupled to the electrical rotary joint 1206 and fed through the main shaft 1218 to provide power to other electrical systems or components on the vertical axis wind turbine 1200 such as, but not limited to, sensors, motors, strain gauges, or lighting on the inflatable vertical axis wind turbine.

A hydraulic caliper brake 1217 may be provided to control the speed of the main shaft 1218. The hydraulic caliper brake 1217 may be coupled to an air compressor 1219 and held open by compressed air. In one embodiment, a portable air compressor may be used. Alternatively, a stationary air compressor located in a building may be used. A solenoid valve 1220 may be used to regulate the air pressure from the air compressor. In some embodiments, it may be desirable to have the hydraulic caliper brake 1217 configured to be in the closed position when the solenoid valve 1220 is closed (or in other words the brake may be held in the open position by the compressed air when the solenoid is opened), so that if power is lost to the solenoid valve when the system is running, the hydraulic caliper brake 1217 may engage the brake disk 1221 and stop the main shaft 1218.

A hydraulic power unit 1222 may be used to increase the pressure of the air sent from the air compressor to the hydraulic caliper brake 1217. Pressure sensors 1223, 1224 may be used to monitor the pressure of the air from the air compressor and the hydraulic pressure in the hydraulic power unit. A shut-off valve/quick-exhaust valve 1225 may be included to cut off air to the hydraulic caliper brake 1217 in the event the solenoid fails and/or for servicing the wind turbine 1200. A filter regulator 1226 may be provided to remove contaminates from the compressed air.

In some embodiments, it may be desirable to have the brake disc 1221 and hydraulic caliper brake 1217 located on the main shaft 1218. If, for example, the hydraulic caliper brake 1217 was located on the motor and the connection between the transmission and motor failed, then the hydraulic caliper brake 1217 would no longer be able to stop the main shaft 1218. By placing the brake disc 1221 on the main shaft 1218, the system may be stopped regardless of whether the connection between the transmission 1201 and motor 1204 failed. Note that this does not limit the use of the hydraulic caliper brake to only the main shaft and the hydraulic caliper brake may be used at other locations on the transmission or on the motor.

A motor drive 1227 may be provided. The motor drive 1227, in some embodiments, may be a four quadrant servo-amplifier. In some embodiments, the motor drive 1227 controls power to and from the DC bus of the system controller 1203. The motor drive may use a standard RS232 signal to communicate with the DC bus of the system controller 1203. However, in some embodiments, the motor drive 1227 may use an analog/digital signal to communicate with the DC bus of the system controller 1203. A resolver 1236 may be rotatably coupled to the motor 1204 and communicatively coupled to the motor drive 1227. The resolver 1236 may measure the position of the motor 1204 and transmit this data to the motor drive 1227. Using the rotational speed of the motor and the torque measurements from the load gauge 1202, the overall power generation of the system may be calculated. A shunt resistor 1228 may be connected to the motor drive 1227 to convert the output power from the motor 1204 and regulate the DC bus voltage. In some embodiments, the shunt resistor may be located in a water tank for maintaining the temperature of the shunt resistor 1228, which, in some embodiments, may provide cooling to the shunt resistor 1228, and the water may be circulated by a shunt water pump 1232. A shunt cooling fan 1231 such as, but not limited to a radiator may be provided to cool the shunt resistor 1228. Current sensors 1230 may be used to measure voltage and current in the shunt.

In some embodiments, additional power that is not dissipated by the shunt resistor may be transmitted through the high voltage DC bus to power other system components 1233 and the shunt cooling system 1234. Moreover, additional power that is not dissipated by the shunt resistor 1228 may be transmitted through the high voltage DC bus to a battery charger 1235. Using an inverter (not shown) power may be used to charge batteries such as, but not limited to, a vehicle battery. Alternatively, the inverter may be used to plug the system into an electrical power grid, so the system may supply power to the grid or to a home.

The system controller 1203 may be programmed to open the solenoid valves 1212 to deflate the inflatable vertical axis wind turbine 1200 at certain wind speeds, in order to prevent buckling. The system controller 1203 may also be programmed to turn on the blower 1207 and open the solenoid valves 1208 to inflate the inflatable vertical axis wind turbine 1200 when a particular minimum air speed, necessary to produce power, may be obtained. Moreover, the system controller may be programmed to only operate when a certain user-defined threshold of power may be produced. The system controller may also be programmed to operate the motor (and draw power from the system) and rotate the inflatable vertical axis wind turbine 1200 when there is no wind or not enough wind to generate power for the system.

The system controller 1203 may also be programmed to record and store data such as, but is not limited to, ambient air temperature, wind speed, wind directionality, blower pressure, blades and mast pressure, air compressor pressure, brake pressure, torque generated by the transmission, shunt current and voltage, motor speed, current and voltage sent to the battery charger, shunt cooling system, and other system components. Based on this data, optimal power outputs may be determined for given weather conditions. The system controller 1203 may store these optimal weather conditions and be programmed to inflate inflatable vertical axis wind turbine 1200 and release the hydraulic caliper brake 1217 when the optimal conditions are met. The system controller 1203 may also be programmed with heuristic algorithms and attempt to autonomously operate the motor 1204 at various speeds and rotate the inflatable vertical axis wind turbine 1200 and measure the power output for the system at given speeds in order to find the optimal wind turbine speed for producing the maximum power in a given set of weather conditions.

In some embodiment, wireless communication may be communicatively coupled to the system controller 1203. In some embodiments, a wireless router (not shown) may be communicatively coupled to the system controller 1203. However, in other embodiments, any type of wireless communications may be used. For illustrative purposes only, the wireless router embodiment is described herein. The wireless router may transmit data recorded by the system controller to a remote server or computer. In some embodiments, the wireless communications may be between any machine and the system controller, including, but not limited to, a smart phone, a laptop, a net book, a cell phone, a PDA, etc. In some embodiments, the system controller 1203 may be wirelessly communicatively coupled to a remote server and/or a remote control center. However, for illustrative purposes only, a remote computer is described. Some of the data that may be collected and transmitted include, but is not limited to, ambient air temperature, wind speed, wind directionality, blower pressure, blades and mast pressure, air compressor pressure, brake pressure, torque generated by the transmission, shunt current and voltage, motor speed, current and voltage sent to the battery charger, shunt cooling system, and other system components. Moreover, the wireless router may be coupled to a camera and transmit images and video from the camera to a remote computer. Recorded data such as, but not limited to, the voltage and the current in the shunt resistor, may be recorded and plotted against wind speed and weather conditions.

From the remote computer, a user may input commands to the system controller including, but not limited to speed commands for the motor, commands to engage or disengage the hydraulic caliper brake, and commands to inflate or deflate the inflatable vertical axis wind turbine. The wireless router may receive information such as, but not limited to, weather advisories and the system controller may be programmed to inflate or deflate the inflatable vertical axis wind turbine or engage or disengage the hydraulic caliper brake based on the information.

Display System

Various embodiments of the wind turbine apparatus, systems and methods described herein may include a mechanism for generating an image on the blades of a wind turbine and/or a display system. The system may utilize the persistence of vision to generate images as the wind turbine rotates. As the blades of the wind turbine rotate, the display means, coupled to the blades, may be turned on or off in synchronization with the rotation of the blades. As the blade passes the field of view of an observer, the display means may be on or off and the observer may see the image displayed. The image produced by the blade may persist for a period of time after the image is shown. As the next blade rotates and passes by the field of view of the observer, another image may be displayed, and the persistence of vision allows the images to appear continuous. The images generated may include, but are not limited to, pictures, text, symbols, numbers, the date and time, weather forecasts, traffic information, and advertising.

The system may include a plurality of display means, such as, but not limited to, a plurality of light-emitting diodes (LEDs), coupled to the blades or airfoils of the turbine. Moreover, other types of display means may be used, alone or in combination with other display means, including, but not limited to, cathode-ray tubes, organic light-emitting diodes (OLEDs), liquid crystal displays (LCDs), plasma displays, or any other display means that produce visible light. In various embodiments, the display means may vary in size and color and different combinations of display means may be used. In addition, the system may be configured to have any number of displays arranged in any number of rows or columns necessary to display an image.

A control system may be used to control the display means. In some embodiments the control system may include, but is not limited to, a microcontroller communicatively coupled to the display means and a power supply which may power the display means and the control system. The microcontroller may include, but is not limited to, a processor, a memory block, and an I/O block. The connection between the microcontroller and the display means may be a wired or wireless connection in various embodiments. In certain embodiments, the control system and display means may be powered by the energy produced by the wind turbine. With respect to the microcontroller, an algorithm may be programmed into the microcontroller to control and adjust when the display means turn on and off, so as to produce an image based on persistence of vision. The algorithm may also vary when the display means are turned on and off based on the rotation of the turbine, to ensure that the image is visible regardless of the speed of the wind turbine. The control system may further include a positioning sensor that detects the position of the wind turbine as it rotates, so as to measure the speed of the rotation. The positioning sensor may then transmit the position and speed data to the microcontroller, to be used in determining when to turn the display means on and off.

Further, the control system may vary the intensity and brightness of the displays based on the time of day to increase the visibility of the image. The control system may change the images over time based on a pre-determined timeframe (i.e. Image A is displayed for 30 minute and then Image B is displayed for 30 minutes) and/or based on the time of the day or the day of the week (i.e. Image A is displayed between 12:00 AM to 11:59 AM and Image B is displayed from 12:00 PM to 11:59 PM).

Although an image may be generated when the wind turbine is rotating, in alternative embodiments, an image may be generated when the wind turbine is not rotating. In such embodiments, the display means may generate a stationary image or the image may "move" along the displays (i.e. text may scroll across the display means).

In various embodiments, the microcontroller may be communicatively coupled to a remote device such as, but not limited to, a remote computer, mobile device, and/or router. A user may use the remote device to transmit commands to the microcontroller, such as but not limited to, commands to changing the image shown, and/or commands to turn off the display means. Further, the remote device may receive data from the microcontroller.

Persistence of vision refers to a visual phenomenon that is responsible for the continuity of rapidly presented visual images. When an image is presented to the human eye, there is a brief retinal persistence of the first image. If a second image is shown rapidly after the first, the brain is unaware of the momentary lapse between images due to the persistence of the first image. The persistence of the first image fills in the momentary lapse between the first and second image, thereby making the images appear continuous. This phenomenon is what allows for the images in animation, movies, and television to seem continuous. Persistence of vision may also allow for images to be displayed on rotating objects.

Figure 14:
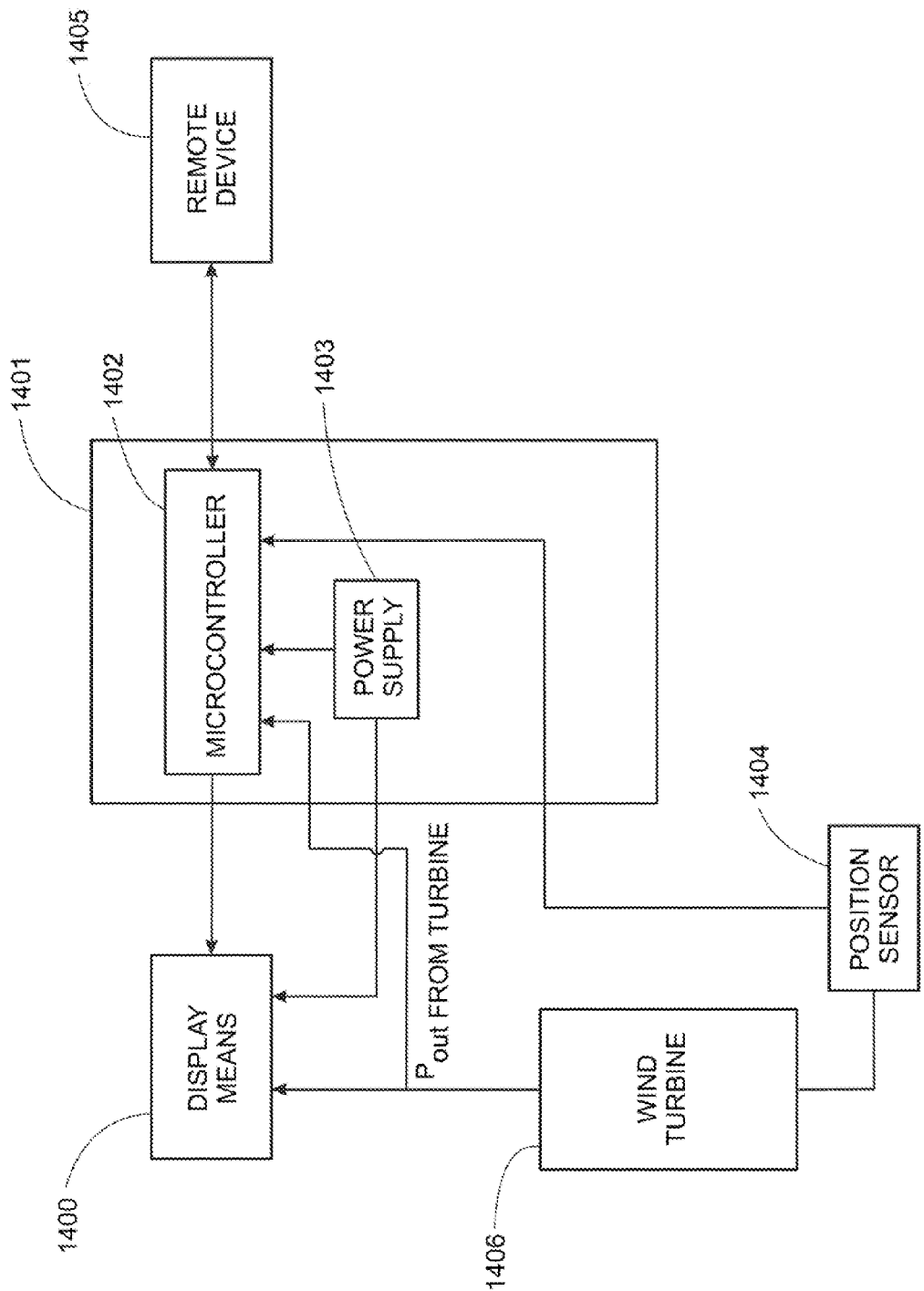
FIG. 14 is a diagram of one embodiment of a display system.

Referring now to FIG. 14, a method, system and apparatus of generating an image on the blades of a wind turbine is shown. The system may be include, in some embodiments, at least one/a plurality of display means/mechanisms 1400. In one embodiment, the display means 1400 includes at least one/a plurality of light-emitting diodes (LEDs) coupled to the blades of a wind turbine. Moreover, other types of display means may be used, alone or in combination, including, but not limited, cathode-ray tubes, organic light-emitting diodes (OLEDs), liquid crystal displays (LCDs), and/or plasma displays. In addition, in various embodiments, the system may be configured to have any number of displays arranged in any number of rows or columns necessary to display an image.

A control system 1401 may also be used to control the sequencing of the display means 1400. The control system 1401 may include a microcontroller 1402 for sequencing the display means 1400, and power supply 1403 for the display means and microcontroller. The microcontroller may further include a processor, a memory block, and an I/O block. In some embodiments, the control system 1401 and display means 1400 may be powered by the energy produced by the wind turbine 1406. In some embodiments, the means of generating an image on the blades of a wind turbine may be integrated into other control systems such as, but not limited to, the control system described herein. In such embodiments, the display means 1400 may be communicatively coupled to and controlled by the system controller, for example, in some embodiments, the controller may be as shown as 1203 in FIG. 12. Further, in some embodiments, the display means may be powered by a high voltage DC bus, shown as 1233 in FIG. 12 or it may be powered by a separate power supply. In some embodiments, the methods/mechanisms/means of generating an image on the blades of a wind turbine is not limited to being used in conjunction with the vertical wind turbines described herein and may be used on any vertical or horizontal wind turbine.

As the blades rotate, the display means may be turned on or off in synchronization with the rotation of the blades, so as to form an image based on the persistence of vision. As a blade passes the field of view of an observer, the display means may be on or off, depending on the image displayed. The image produced by the blade may persist for a period of time. As the next blade rotates and passes by the field of view of the observer, another image may be displayed, and the persistence of vision allows the images to appear continuous. In some embodiments, the image produced may be any one or more images, including, but not limited to, images of text, pictures, and/or symbols. Further, the microcontroller may be programmed into the control system to adjust when the display means turn on and off, so as to produce an image based on persistence of vision. The algorithm may also vary when the display means are turned on and off based on the rotational speed of the turbine, to ensure that the image is visible regardless of the speed of the wind turbine. The microcontroller may be used to change the image of text, picture, and symbols based on user input or the microcontroller may be pre-programmed to automatically adjust or change the image. Although the system described may be used to generate images while the turbine is rotating, in some embodiments, an image may be generated also and/or when the wind turbine is stationary. In such embodiments, the display means may generate a stationary image or the image may "move" along the displays (i.e. text may scroll across the display means).

In some embodiments, the system may further include a positioning sensor 1404 that detects the position of the wind turbine as it rotates, so as to measure the speed of the rotation. The positioning sensor may then transmit the position and speed data to the microcontroller, to be used in determining when to turn the display means on and off. In some embodiments, the microcontroller may be communicatively coupled to a remote device 1405 such as, but not limited to a remote computer, mobile device, or router. In some embodiments, the remote device may transmit commands to the microcontroller and may receive data from the microcontroller such as, but not limited to, the speed of the wind turbine.

Self-Starting System

In various embodiments, a self-starting vertical axis wind turbine may be used. The system may include a support and airfoils coupled to the support. The wind turbine may have any number of airfoils. The airfoils may be configured to have a cavity between the upper and lower camber which is in fluid communication with the wind, via one or more apertures on the lower or upper camber. Wind may impinge the cavity via the apertures and directly impart a force on the airfoil, thereby rotating the airfoil about the support. Furthermore, the airfoil may also function like a lift-type blade and generate lift as the airfoil rotates about the support. As such, the turbine is capable of self-starting without the use of a motor. It should be noted that the cavity and apertures may be any shape, size or orientation. Further, the shape, size or orientation of the cavity and apertures may vary in various embodiments depending, for example, but not limited to, the desired aerodynamic properties of the airfoil. Moreover, the cavity and apertures may be configured to minimize the turbulent wake behind the trailing edge of the airfoil as it rotates about the support. Note that in some embodiments, the wind turbine may also use a motor, machine, or other source to self-start.

With respect to the airfoils, in various embodiments, the airfoils may also have any shape, size, configuration, or orientation including, but not limited to, asymmetrical, symmetrical, or flat-bottomed configurations. The airfoils may be constructed from a material such as, but not limited to, aluminum or fiberglass. In some embodiments, other materials may be used to make the turbine including, but not limited to, any material that may sustain exposure to wind. Further, the airfoils may be constructed from multiple sections that are coupled together. In other embodiments, parts of or the entirety of the rotor may be inflatable.

Lift-Type Rotor

There are two types of vertical axis wind turbines: lift-type and drag-type. Lift-type rotors typically have at least two airfoils coupled to a support. Generally, an airfoil is designed such that the air that passes along the upper camber is at a greater speed than the lower camber. As a result, a pressure differential is created across the airfoil, thereby generating upward lift. In a lift-type wind turbine, as the airfoils rotate about the support, the pressure differential created across the airfoil will generate lift which will cause the airfoils to rotate about the support. However, the rotor must be moving in order to generate lift. As a consequence, if the rotor is stationary, it cannot generate lift and the lift-type rotor cannot self-start regardless of how high the wind speed is.

In some embodiments, one method of starting the rotor is to use an external force from a motor or other source to start the rotor, at which point the airfoils will rotate and generate lift and the rotor may then maintain the rotation without any other external forces being applied from a motor. Another method of self-starting a lift-type rotor is to use blades that can pivot. The blades may be pivoted so that they are perpendicular to the wind, in order to generate drag and start the turbine. However, there are some disadvantages to this approach. Typically, the blade pivot mechanism is complex and cumbersome to assemble and increases the weight on the armature or frame coupling the blade to the central support. Furthermore, sensors may be needed to control the pivot of the blades as it rotates, which can increase the cost and complexity of the system. Some examples of lift-type rotors include Darrieus rotors, and Giromills.

In contrast to lift-type rotors, drag-type rotors are able to self-start. In drag-type rotors, at least two blades are coupled to a support. The blades are typically flat or curved blades. Incoming wind may impinge the blades of the rotor and directly impart a force on the blades thereby rotating the blades about the support. As such, drag-type rotors can be self-starting without the use of a motor. Described below is a lift-type vertical axis wind turbine that may self-start without the need for an external force from a motor or other machine to start the rotor.

Figures 13A, 13B:
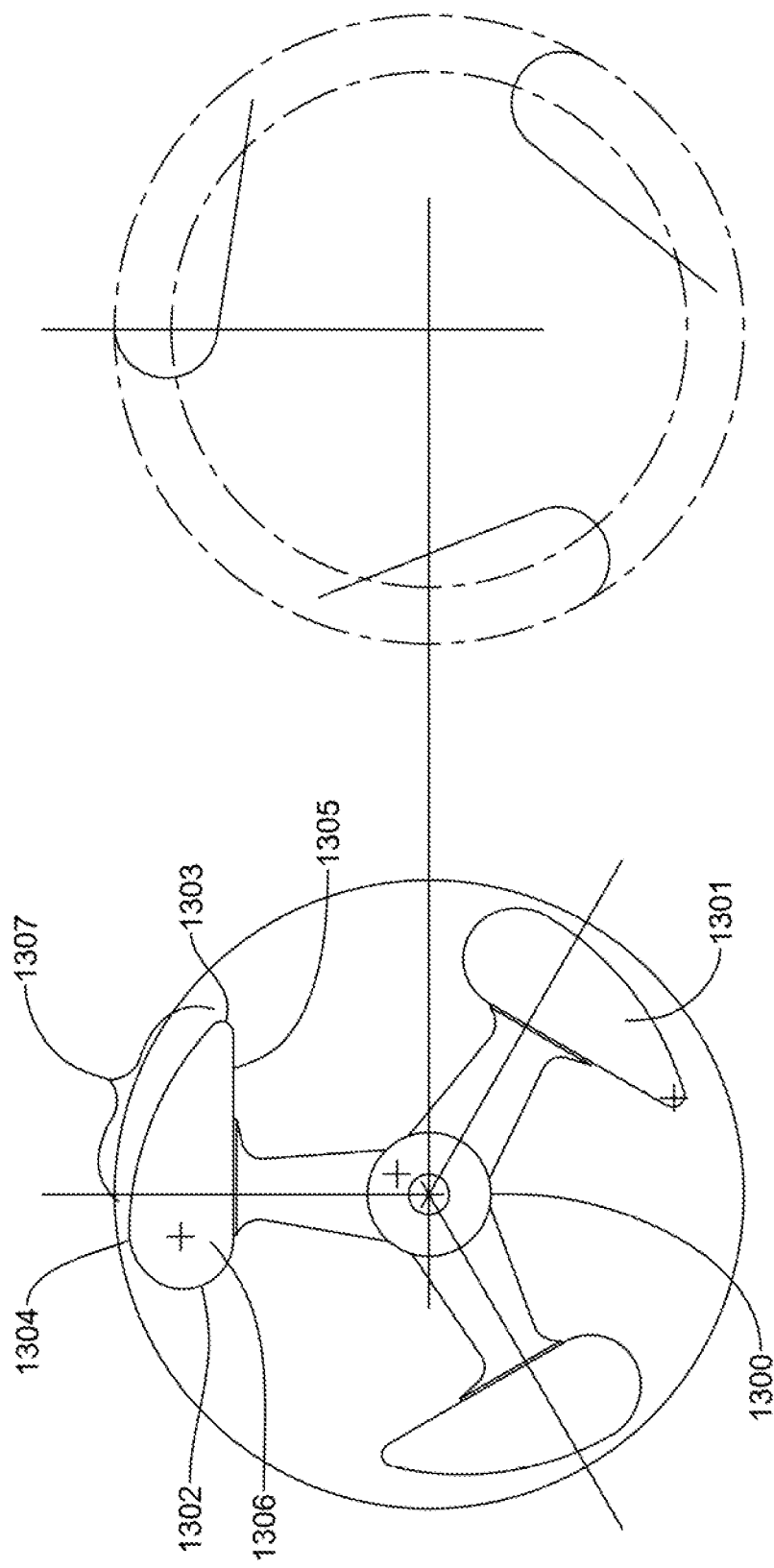
FIGS. 13A and 13B are views of one embodiment of a vertical axis wind turbine.

Referring to FIGS. 13A-13B, views of one embodiment of a vertical axis wind turbine is shown. In one embodiment, the vertical axis wind turbine may be comprised support 1300 and at least two airfoils 1301 coupled to the support 1300, wherein each airfoil has a leading edge 1302, a trailing edge 1303, an upper camber 1304, and a lower camber 1305. The lower camber may run continuously from the leading edge to the trailing edge and the upper camber may run from the leading edge and extend toward, but not connect to, the trailing edge. In some embodiments, the upper camber may run continuously from the leading edge to the trailing edge and the lower camber may run from the leading edge and extend toward, but not connect to, the trailing edge. In some embodiments, the lower camber may run continuously from the leading edge to the trailing edge and the upper camber may run continuously from the leading edge to the trailing edge.

In some embodiments, a cavity 1306 and may be formed between the upper and lower camber which is in fluid communication with the wind, via one or more apertures 1307 on the lower or upper camber. When the apertures 1307 are facing towards the wind (i.e. as the airfoil is facing leeward), the wind may directly impinge the cavity 1306 via the apertures 1307 on the airfoil and directly impart a force on the cavity and rotate the airfoil. Furthermore, the airfoil may also function like a lift-type blade and generate lift when the airfoil rotates about the support. In some embodiments, the wind turbine may also use motor, machine, or other source to self-start.

In some embodiments, the support and airfoils may be completely rigid structures. In other embodiments, the support and airfoil may be completely inflatable. In some embodiments, the support and airfoil may be partially inflatable and partially rigid. Moreover, in various embodiments, the airfoil may also have any shape, size, configuration, or orientation including, but not limited, asymmetrical, symmetrical, and/or flat-bottomed configurations. In various embodiments, the airfoil may be constructed from a material such as, but not limited to, aluminum and/or fiberglass. In addition, the airfoils may include at least one, and in some embodiments, a plurality, of subsections that may be coupled together via various methods such as, but not limited to, welding.

Although the transmission, mobile transportation unit, display system, and control system described herein may be described in conjunction with the inflatable vertical wind turbine, it should be noted that the self-starting vertical wind turbine described herein, or any vertical wind turbine, may be also used in conjunction with any or all of the components described herein, including, but not limited to, the transmission, mobile transportation unit, display system, and/or control system. By way of example, and not by way of limitation, in some embodiments, the support 1300 may be coupled to the platen (shown as 104 in FIG. 1) which may be coupled to the transmission (shown as 1201 on FIG. 12). The control system (as shown in FIG. 12) in some embodiments may be used to control the speed of the wind turbine.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A wind turbine system comprising:
an anemometer for measuring wind speed;
a temperature sensor for measuring ambient temperature;
a system controller configured to receive output from at least the anemometer and the temperature sensor;
a wind turbine for generating a DC output power, the wind turbine comprising:
a transmission;
a motor;
a motor drive;
a shunt resistor connected to the motor drive, wherein the shunt resistor converts the output power from the wind turbine and regulates the output power DC voltage;
an electrical rotary joint coupled to the transmission and in communication with the system controller, the electrical rotary joint providing a power connection to at least one component of the wind turbine system;
a load cell coupled to the transmission and in communication with the system controller, the load cell configured to measure torque output of the transmission; and
a resolver rotatably coupled to the motor and communicatively coupled to the motor drive, wherein the resolver measures a position of the motor and torque measurements from the load cell,
wherein the system controller receives wind speed, ambient temperature and load cell information and determines optimal power outputs of the wind turbine.

2. The system of claim 1, further comprising a wind vane in communication with the system controller, the wind vane for measuring wind directionality.

3. The system of claim 1, wherein the system controller receives output from the temperature sensor and calibrates the anemometer using the temperature sensor output.

4. The system of claim 1, further comprising a wireless router coupled to the system controller, wherein the wireless router transmits data from the system controller to a remote server.

* * * * *